(12) United States Patent
Choi et al.

(10) Patent No.: US 11,778,584 B2
(45) Date of Patent: Oct. 3, 2023

(54) PARAMETER UPDATE FOR RANGE-BASED POSITIONING

(71) Applicant: Intel Corporation, Santa Clara, CA (US)

(72) Inventors: Jeongsik Choi, San Jose, CA (US); Yang-Seok Choi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 766 days.

(21) Appl. No.: 16/729,104

(22) Filed: Dec. 27, 2019

(65) Prior Publication Data

US 2021/0204243 A1 Jul. 1, 2021

(51) Int. Cl.
*H04W 64/00* (2009.01)
*H04W 84/12* (2009.01)
*G01S 5/02* (2010.01)
*H04B 1/16* (2006.01)

(52) U.S. Cl.
CPC ......... *H04W 64/006* (2013.01); *G01S 5/0215* (2013.01); *H04B 1/16* (2013.01); *H04W 84/12* (2013.01)

(58) Field of Classification Search
CPC ....... G01S 5/0215; H04W 64/006; H04B 1/16
USPC .......................................... 342/47, 359, 450
See application file for complete search history.

(56) References Cited

U.S. PATENT DOCUMENTS

| 7,856,414 | B2 * | 12/2010 | Zee | G06Q 50/184 |
| 2003/0229592 | A1 * | 12/2003 | Florance | G06Q 30/06 |
| | | | | 705/51 |
| 2017/0235848 | A1 * | 8/2017 | Van Dusen | G06F 16/904 |
| | | | | 705/12 |

OTHER PUBLICATIONS

"Wi-Fi RTT (IEEE 802.11mc)", https: source.android.com devices tech connect wifi-rtt, (Oct. 12, 2019), 4 pgs.

(Continued)

*Primary Examiner* — Bo Fan
(74) *Attorney, Agent, or Firm* — Schwegman Lundberg & Woessner, P.A.

(57) ABSTRACT

Methods, apparatuses, and computer readable media for parameter update for range-based positioning. An apparatus of a station (STA) for parameter update for range-based positioning, the apparatus including processing circuitry configured to perform a distance estimating method with access points (APs) to determine distance estimates between the APs and the STA, the distant estimating method including parameters, and configured to determine a location of the STA based on the distance estimates between the APs and the STAs and locations of the APs. The processing circuitry further configured to: update the parameters by subtracting from a parameter of the parameters a learning rate times a derivative of a cost function with respect to the parameter, where the cost function is based on the determined location of the STA, the locations of the APs, and the distance estimates between the APs and the STA.

19 Claims, 21 Drawing Sheets

(56) References Cited

OTHER PUBLICATIONS

Banin, L, "WiFi FTM and map information fusion for accurate positioning", International Conference on Indoor Positioning and Indoor Navigation, (Oct. 2016), 4 pgs.

Ibrahim, Mohamed, "Verification: Accuracy evaluation of WiFi fine time measurements on an open platform", 24th Annual International Conference on Mobile Computing and Networking (MobiCom), (2018), 417-427.

Tarrio, Paula, "Weighted Least Squares Techniques for Improved Received Signal Strength Based Localization", Sensors 11, (2011), 24 pgs.

* cited by examiner

PARAMETER UPDATE FOR RANGE-BASED POSITIONING

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to parameter update for range-based positioning.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
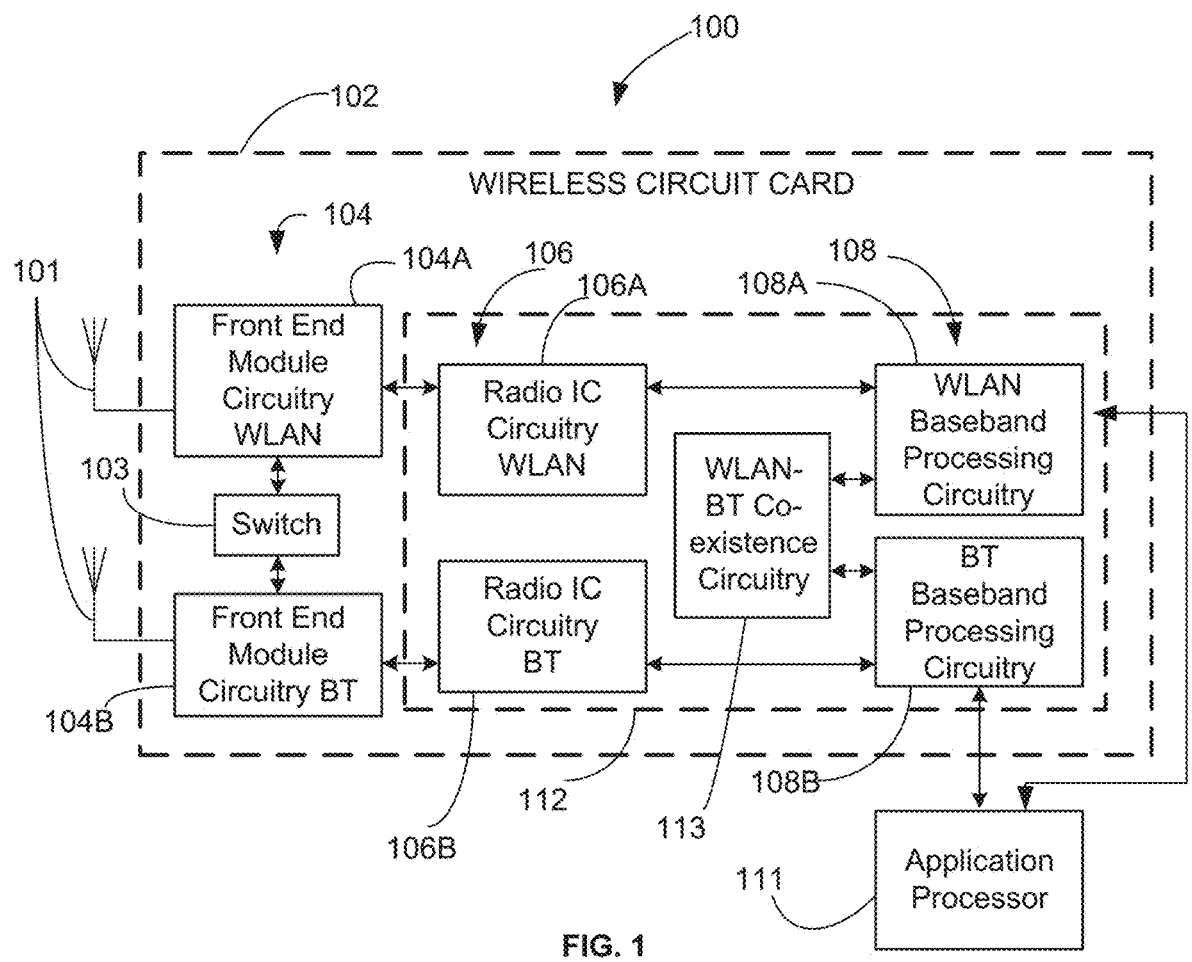
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 1.04B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
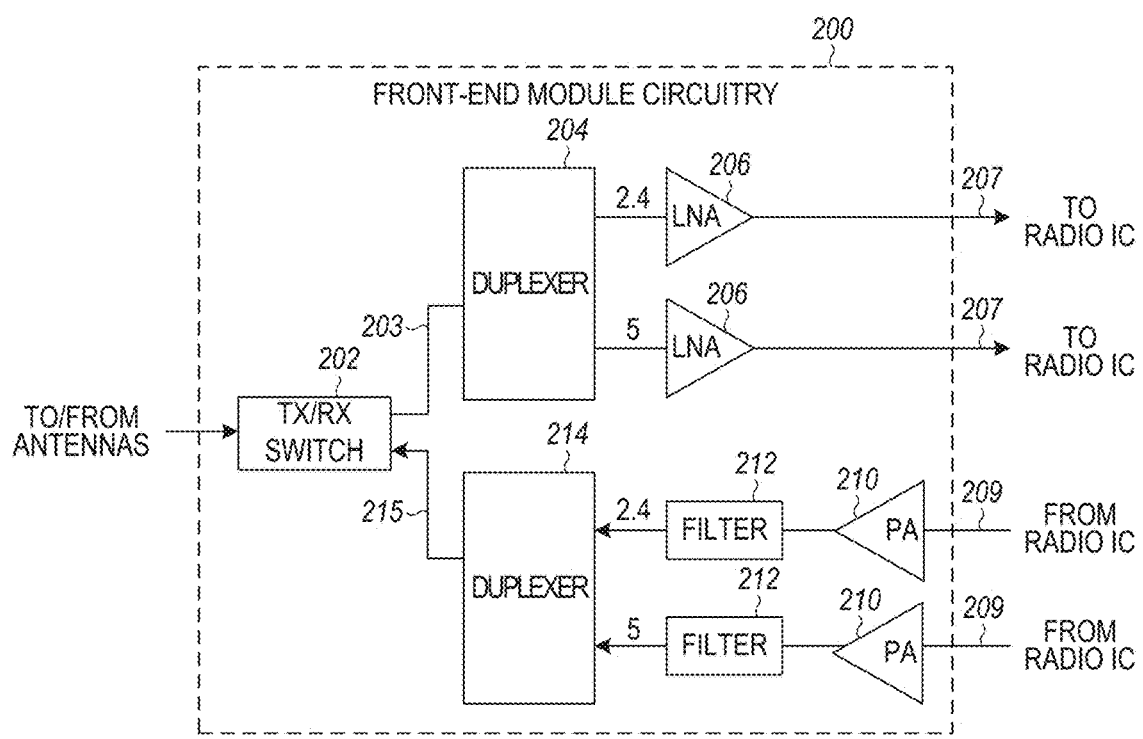
FIG. 2 illustrates FEM circuitry in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
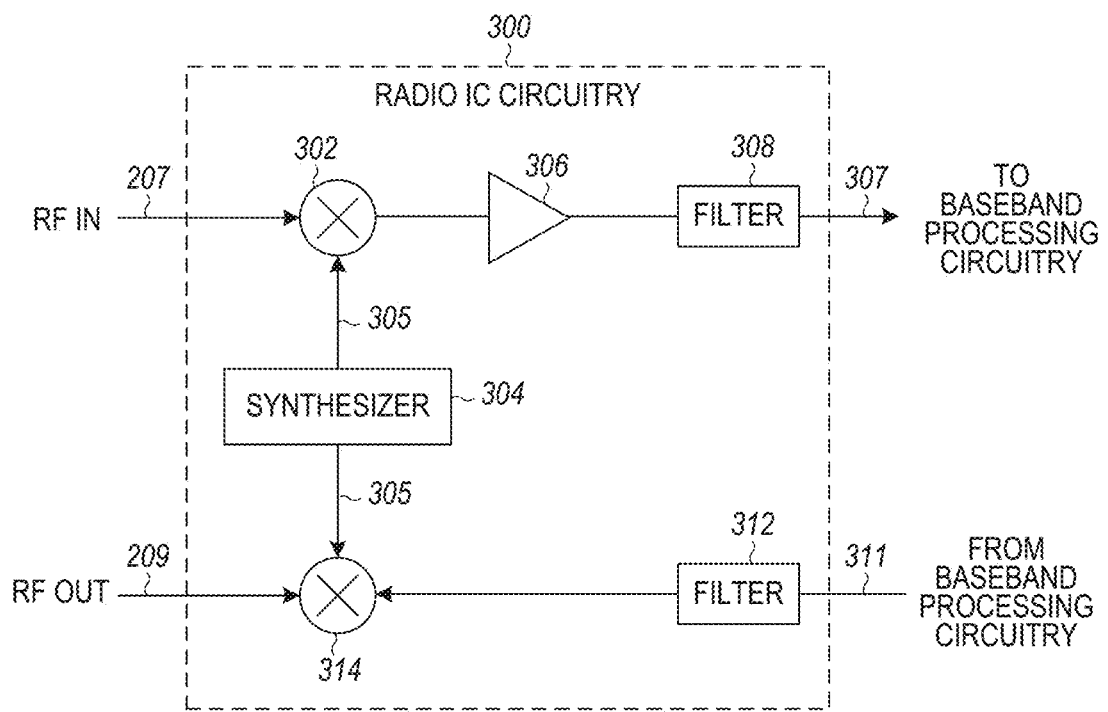
FIG. 3 illustrates radio integrated circuit (IC) circuitry in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RE output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RE input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may, be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
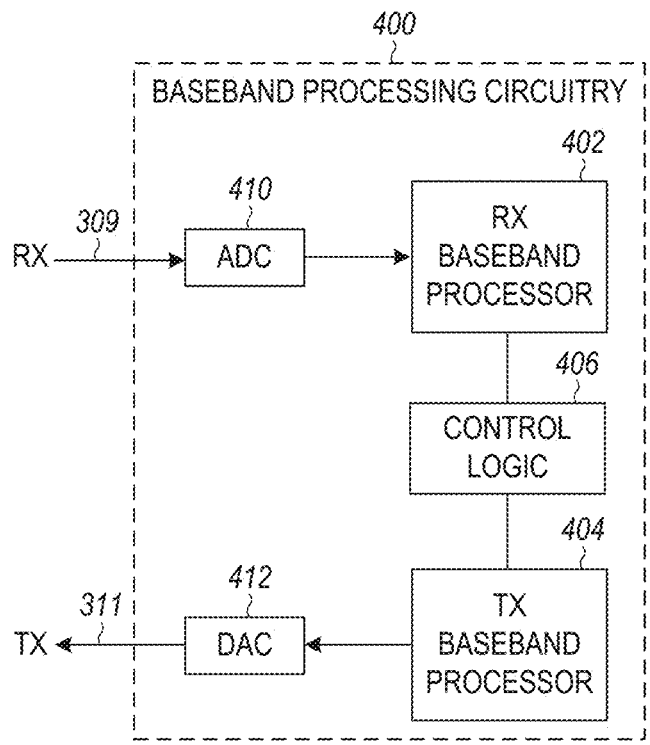
FIG. 4 illustrates a functional block diagram of baseband processing circuitry in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFL In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
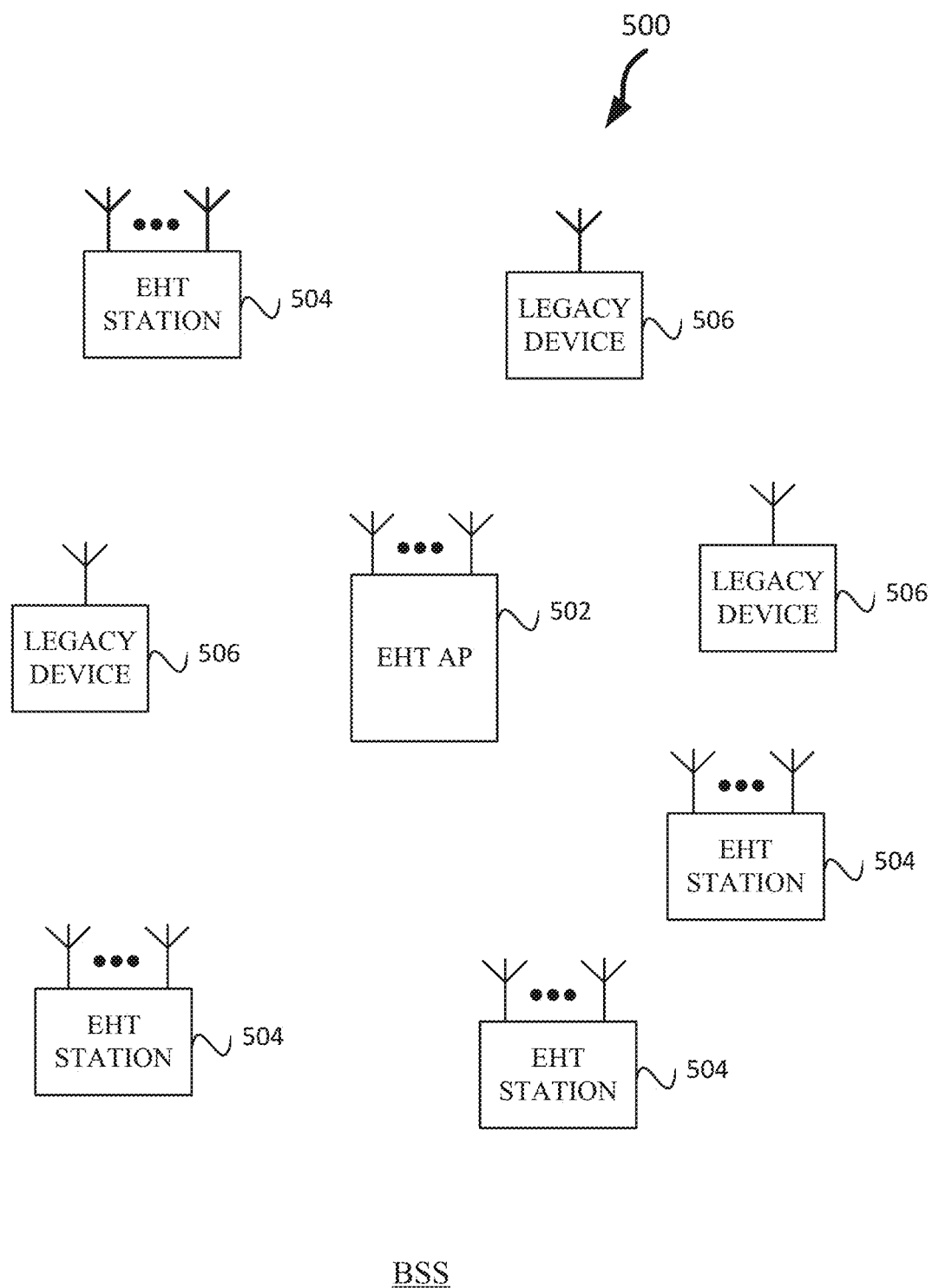
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be termed an AP, a plurality of EHT (e.g., IEEE 802.11ax/be) stations (STAs) 504, and a plurality of legacy (e.g., IEEE 802.11g/n/ac) devices 506. In some embodiments, the EHT STAs 504 and/or EHT AP 502 are configured to operate in accordance with IEEE 802.11 extremely high throughput (EHT). In some embodiments, the EHT STAs 504 and/or HE AP 520 are configured to operate in accordance with IEEE 802.11az. In some embodiments, IEEE 802.11EHT may be termed. Next Generation 802.11. In some embodiments, the EHT AP 502 may be configured to operate a HE BSS, ER BSS, and/or a BSS, Legacy devices may not be able to operate in the HE BSS and beacon frames in the HE BSS may be transmitted using HE PPDU's. An ER BSS may use ER PPDUs to transmit the beacon frames and legacy devices 506 may not be able to decode the beacon frames and thus are not able to operate in an ER BSS. The BSSs, e.g., BSS, ER BSS, and HE BSS, may used different BSSIDs.

The EHT AP 502 may be an AP using the IEEE 802.11 to transmit and receive. The EHT AP 502 may be a base station. The EHT AP 502 may use other communications protocols as well as the IEEE 802.11 protocol. The IEEE 802.11 protocol may be IEEE 802.11ax. The IEEE 802.11 protocol may be IEEE 802.11 next generation. The EHT protocol may be termed a different name in accordance with some embodiments. The IEEE 802.11 protocol may include using orthogonal frequency division multiple-access (OFDMA), time division multiple access (TDMA), and/or code division multiple access (CDMA), The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one HE APs 502 and may control more than one BSS, e.g., assign primary channels, colors, etc. EHT AP 502 may be connected to the internet. The EHT AP 502 and/or EHT STA 504 may be configured for one or more of the following: 320 MHz bandwidth, 16 spatial streams, multi-band or multi-stream operation (e.g., as disclosed in conjunction with FIGS. 8), and 4096 QAM.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. In some embodiments, when the EHT AP 502 and EHT STAs 504 are configured to operate in accordance with IEEE 802.11EHT, the legacy devices 506 may include devices that are configured to operate in accordance with IEEE 802.11ax. The EHT STAs 504 may be wireless transmit and receive devices such as cellular telephone, portable electronic wireless communication devices, smart telephone, handheld wireless device, wireless glasses, wireless watch, wireless personal device, wireless internet of things device (e.g., refrigerator, clock, prescription bottle, light, etc.), tablet, or another device that may be transmitting and receiving using the IEEE 802.11 protocol such as IEEE 802.1.1EHT or another wireless protocol. In some embodiments, the EHT STAs 504 may be termed extremely high throughput (EHT) stations or stations.

The EHT AP 502 may communicate with legacy devices 506 in accordance with legacy IEEE 802.11 communication techniques. In example embodiments, the EHT AP 502 may also be configured to communicate with EHT STAs 504 in accordance with legacy IEEE 802.11 communication techniques.

In some embodiments, a HE or EHT frame may be configurable to have the same bandwidth as a channel. The HE or EHT frame may be a physical Layer Convergence Procedure (PLOP) Protocol Data Unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the EHT AP 502, EHT STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g, IEEE 802.11EHT/ax embodiments, a EHT AP 502 may operate as a master station which may be arranged to contend for a wireless medium (e.g., during a contention period) to receive exclusive control of the medium for a transmission opportunity (TXOP). The EHT AP 502 may transmit an EHT/HE trigger frame transmission, which may include a schedule for simultaneous UL transmissions from EHT STAs 504. The EHT AP 502 may transmit a time duration of the TXOP and sub-channel information. During the TXOP EHT STAs 504 may communicate with the EHT AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the EHT AP 502 may communicate with EHT stations 504 using one or more HE or EHT frames. During the TXOP, the EHT STAs 504 may operate on a sub-channel smaller than the operating range of the EHT AP 502. During the TXOP, legacy stations refrain from communicating. The legacy stations may need to receive the communication from the EHT AP 502 to defer from communicating.

In accordance with some embodiments, during the TXOP the EHT STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The EHT AP 502 may also communicate with legacy stations 506 and/or EHT stations 504 in accordance with legacy IEEE $02.11 communication techniques. In some embodiments, the EHT AP 502 may also be configurable to communicate with EHT stations 504 outside the HE TXOP in accordance with legacy IEEE 802.11 or IEEE 802.11EHT/ax communication techniques, although this is not a requirement.

In some embodiments the EHT station 504 may be a "group owner" (GO) for peer-to-peer modes of operation. A wireless device may be a HE station 502 or a EHT AP 502. In some embodiments, the EHT STA 504 and/or EHT AP 502 may be configured to operate in accordance with IEEE 802.11mc. In example embodiments, the radio architecture of FIG. 1 is configured to implement the EHT STA 504 and/or the EHT AP 502. In example embodiments, the front-end module circuitry of FIG. 2 is configured to implement the EHT STA 504 and/or the EHT AP 502. In example embodiments, the radio IC circuitry of FIG. 3 is configured to implement the EHT station 504 and/or the EHT AP 502. In example embodiments, the base-band processing circuitry of FIG. 4 is configured to implement the EHT station 504 and/or the EHT AP 502.

In example embodiments, the EHT stations 504, EHT AP 502, an apparatus of the EHT stations 504, and/or an apparatus of the EHT AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-23.

In example embodiments, the EHT station 504 and/or the EHT AP 502 are configured to perform the methods and operations/functions described herein in conjunction with FIGS. 1-23. In example embodiments, an apparatus of the EHT station 504 and/or an apparatus of the EHT AP 502 are configured to perform the methods and functions described herein in conjunction with FIGS. 1-23. The term Wi-Fi may refer to one or more of the IEEE 802.11 communication standards. AP and STA may refer to EHT/HE AP 502 and/or EHT/HE station 504 as well as legacy devices 506.

In some embodiments, a HE AP STA may refer to a EHT AP 502 and/or a EHT STAs 504 that is operating as a HE APs 502. In some embodiments, when a EHT STA 504 is not operating as a HE AP, it may be referred to as a HE non-AP STA or HE non-AP. In some embodiments, EHT STA 504 may be referred to as either a HE AP STA or a HE non-AP. EHT may refer to a next generation IEEE 802.11 communication protocol, which may be IEEE 802.11be or may be designated another name.

Figure 6:
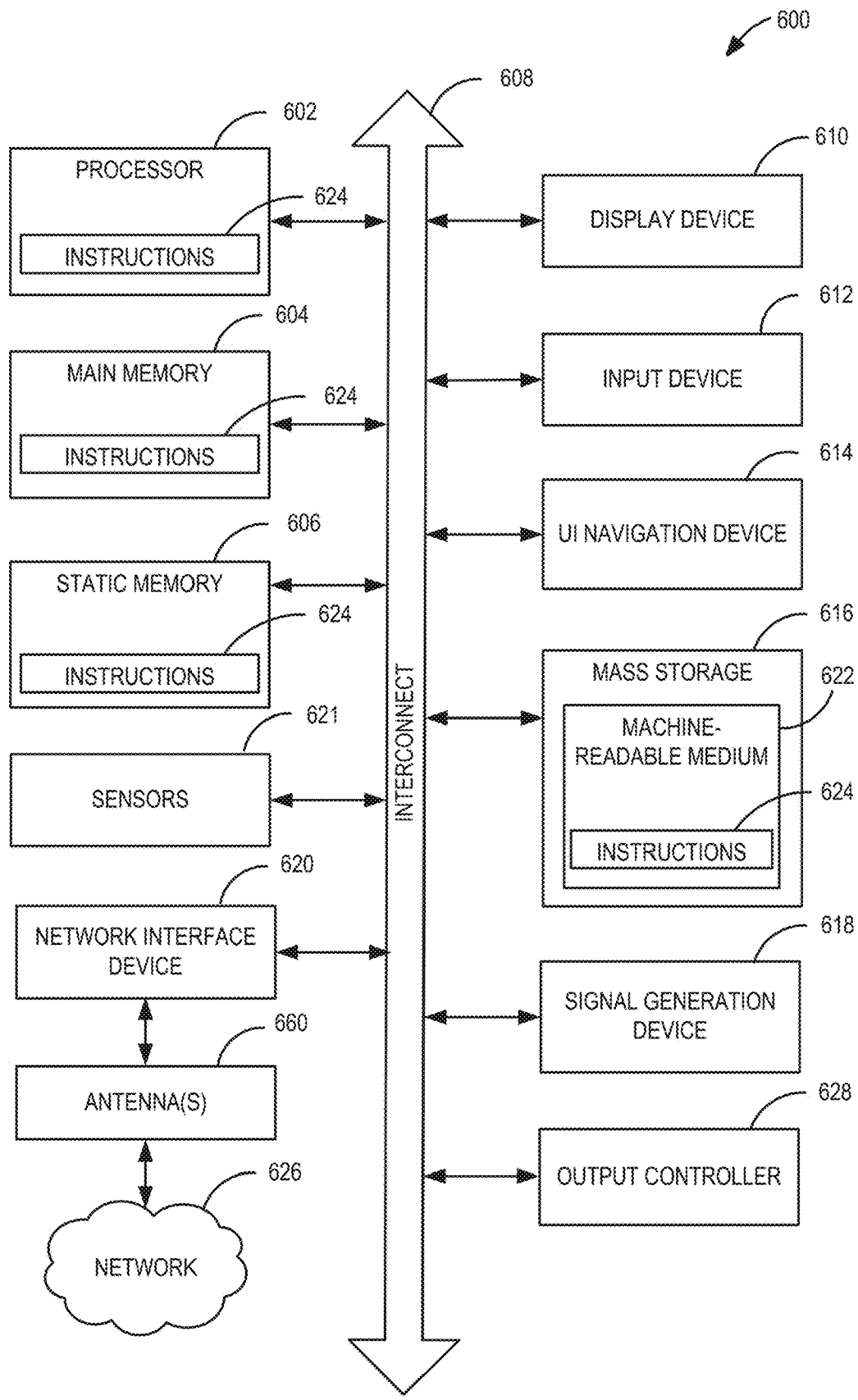
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a EHT AP 502, EHT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS)

sensor, compass, accelerometer, or other sensor. The machine 600 may include an output controller 628, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
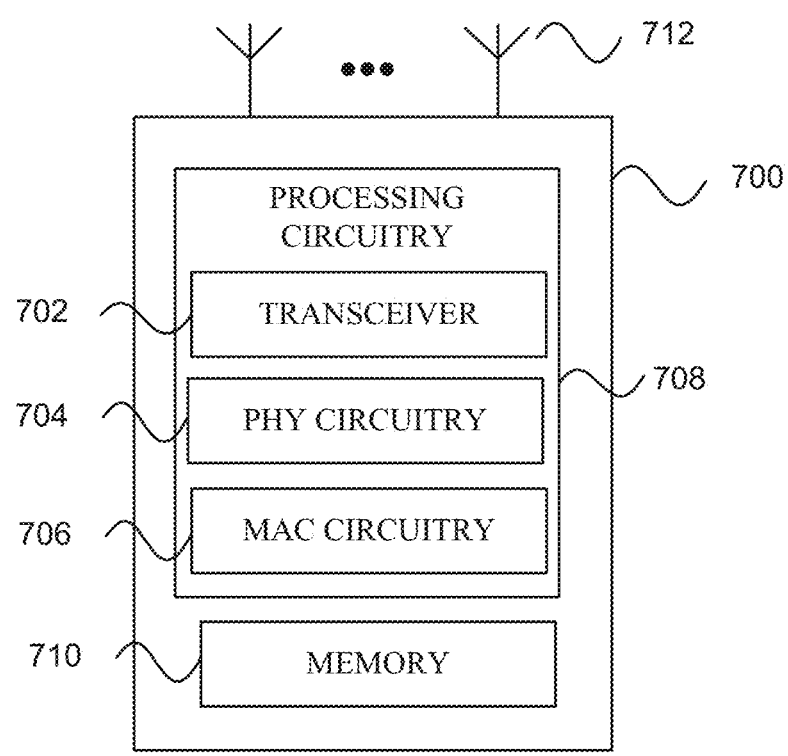
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a EHT STA 504, EHT AP 502, and/or a HE STA or HE AP. A EHT STA 504, EHT AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., EHT AP 502, EHT STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6, Accordingly, techniques and operations described herein that refer to the wireless device 700 may be applicable to an apparatus for a wireless device 700 (e.g., EHT AP 502 and/or EHT STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the EHT stations 504 of FIG. 5 or wireless device 700) and an access point (e.g., the EHT AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

A technical problem in IEEE 802.11 is how to integrate a new generation with the old generations. A new amendment often requires new SIG fields that include information to support new physical (PHY)/media access control (MAC) features for the new amendment. The new SIGs are placed after the L-SIG field so that legacy device 506 will decode the L-SIG and determine a length of the PPDU or packet and defer from transmitting for a time based on the length. When new SIG fields have been defined in a new amendment, for example the IEEE 802.11ax HE-SIG-A, only devices that support IEEE 802.11ax and any follow-on amendments (e.g. IEEE 802.11be) can decode the information in the HE-SIG-A field. Pre-IEEE 802.11ax devices (e.g. legacy device 506) are not able to decode later generation SIG field as they do not know the format to decode the later generation SIG field, e.g., HE-SIG-A or EHT-SIG. However, some of the information (e.g., BSS color, TxOP duration, bandwidth) in later generation SIGs (e.g., HE-SIGA or EHT-SIG) needs to be signaled in future amendments for coexistence, e.g., intra- physical layer (PHY) protocol data unit (PPDU) PPDU power save.

Some embodiments improve coexistence among different IEEE 802.11 STAs (e.g., EHT STAs 504 and HE STAs) and therefore improve overall network efficiency and enable power saving. For example, in some embodiments, intra-PPDU power saving and spatial reuse are improved by providing a common preamble with a common SIG field that also may reduce detection and classification of PPDUs.

Figure 8:
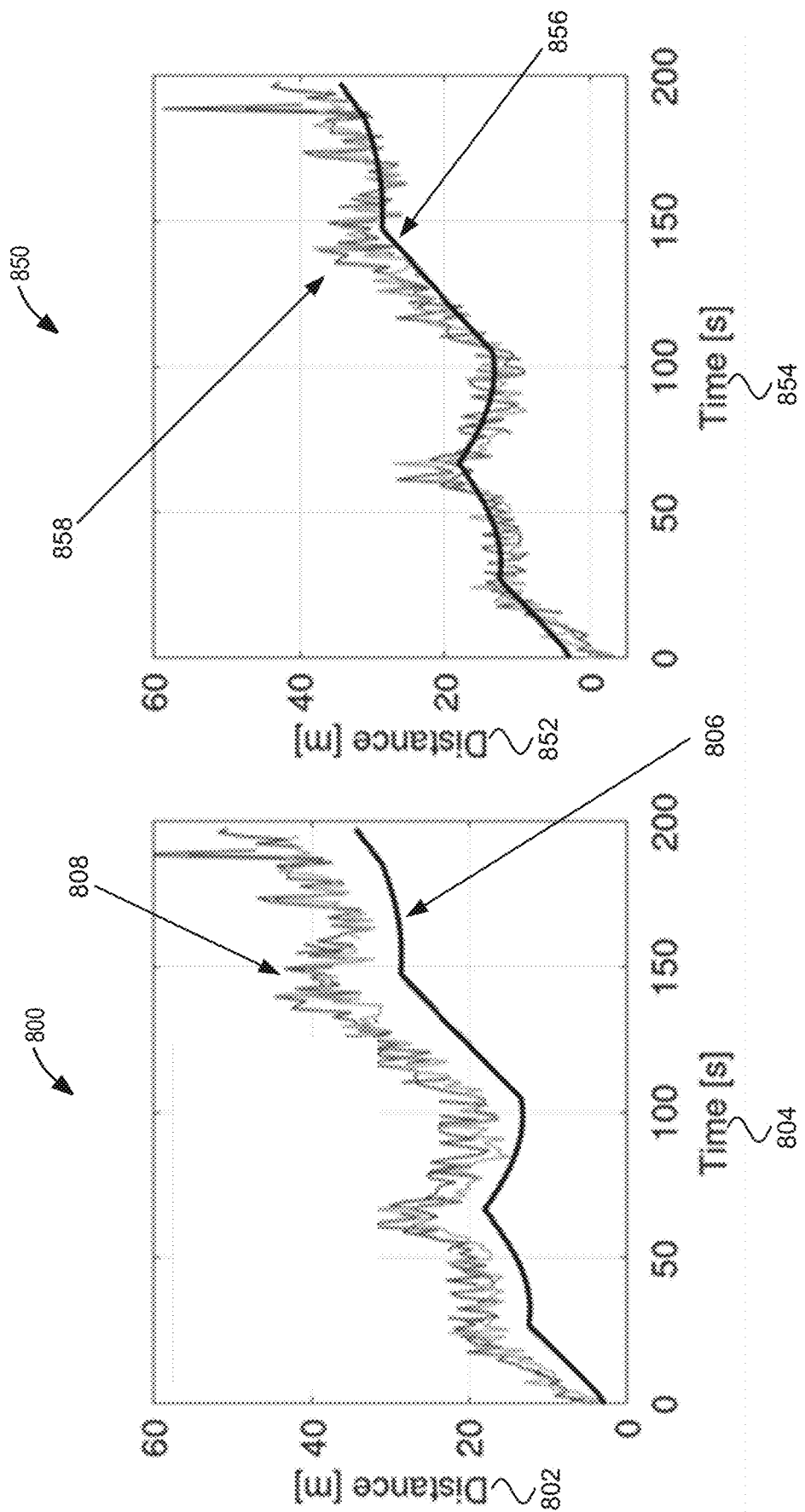
FIG. 8 illustrates raw distance measurements using fine timing measurements (FTMs) and calibrated distance measurements, in accordance with some embodiments.

FIG. 8 illustrates raw distance measurements using fine timing measurements (FTMs) 800 and calibrated distance measurements 850, in accordance with some embodiments. Illustrated in FIG. 8 is distance in meters (m) 802, 852 along vertical axes, time in seconds(s) 804, 854 along horizontal axes, true distance 806 and 856, and AP distances 808, 858. The AP distances 808, 858 are distances 852 determined by three separate APs performing FTM, e.g., in accordance with IEEE 802.11mc/az. The APs may be wireless devices that are acting as APs, e.g., wireless devices such as smartphones running Android®, AP distances 808 are distance measurements without calibration. AP distances 858 are distance measurements with calibration. The difference between the true distances 806, 856, and the AP distances 808, 858 may be termed offsets. The offsets are caused by the different characteristics of the APs. The APs have a large offset from true distance 806, e.g., 6-9 meters. The offset needs to be calibrated before accurate ranging can be performed (e.g., FTM or estimates from received signal strength, RSS). Calibrated distance measurements 850 illustrates that more accurate measurements may be determined (i.e., a distance of a second device from the AP) if the AP are calibrated to reduce offsets.

A technical problem, however, is how to perform a calibration process to reduce the offsets. Some embodiments require a large open laboratory without any metal obstacles with markers every 0.5 m from the source (AP) up to 25 m. The AP then performs 50 FTMs at each marker position for calibration. Even though calibration is done, distance offset may vary depending on the propagation environments. Other calibration methods such as machine learning do not adjust the calibration over time and the offsets change over time.

Some embodiments adaptively improve parameters (e.g., calibrate) in distance estimation models (e.g., offsets). Some embodiments track variation in parameters over time. Some embodiments provide a method to remove offsets in FTM chipsets.

Figure 9:
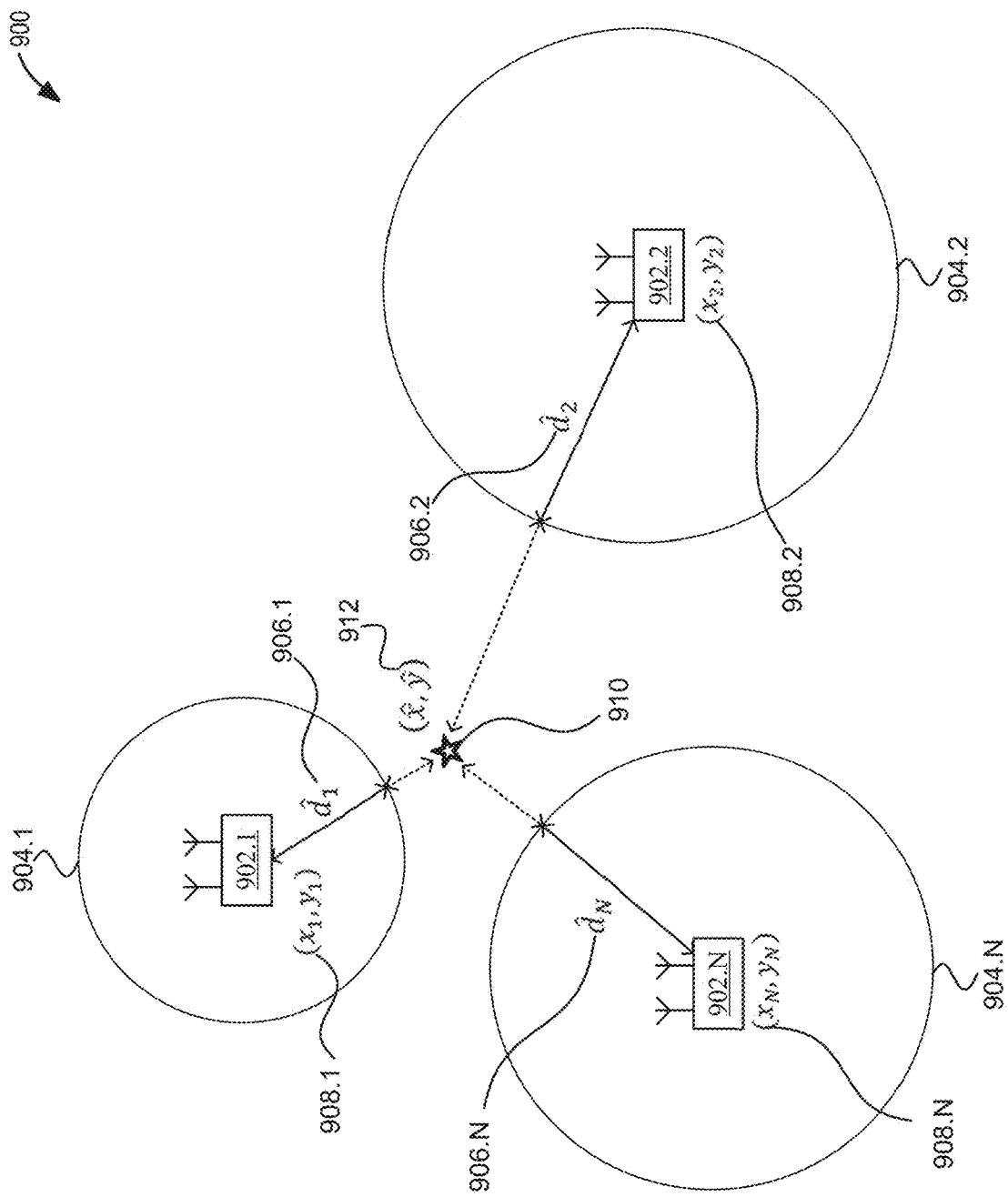
FIG. 9 illustrates distance measurement, in accordance with some embodiments.
Figure 9:
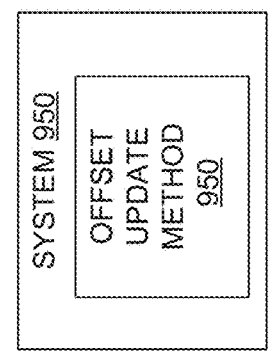

FIG. 9 illustrates distance measurement 900, in accordance with some embodiments. Illustrated in FIG. 9 is APs 902, AP locations 908, STA 910, STA location 912, distance estimations $\hat{d}_i$ 906, distance estimate circles 904, and system 950. The APs 902 may be the same or similar as EHT APs 502. In some embodiments, the APs 902 are configured to operate in accordance with IEEE 802.11az. In some embodiments, the APs 902 are configured to operate ranging measurements based on received signal strength (RSS). AP location 908 are fixed known locations of the APs 902, in accordance with some embodiments. As illustrated, there are N APs 902, where N is three. N may be larger number than three. STA 910 is the same or similar as EHT STA 504, in accordance with some embodiments. In some embodiments, the STA 910 is configured to operate in accordance with IEEE 802.11az. In some embodiments, the STA 910 is configured to operate ranging measurements based on RSS. In some embodiments, the STA 910 is a smartphone or another wireless electronic device, e.g., a wireless watch, wireless glasses, wireless ring, wireless clothing, wireless augmented or virtual reality headset, etc. The offset update method 952, APs 902, and/or STA 910 are configured to determine STA location 912 based on the distance estimations $\hat{d}_i$ 906 and AP locations 908 using triangulation, in accordance with some embodiments.

System 950 may be a separate system in communication with the APs 902 and/or STA 910. System 950 may include a module offset update method 952. In some embodiments, offset update method 952 is implemented in hardware and/or software, e.g., instruction 624 of FIG. 6. Offset update method 952 may be included in one or more of the APs 902 and/or STA 910.

Equation (1): $\hat{d}=f(p)$. Equation (1) discloses a distance estimation model as a function. P represents a vector of information for determining an estimated distance ($\hat{d}$). For example, if FTM is used to determine $\hat{d}$ (estimated distance), then the distance estimation model can be expressed by Equation (2).

Equation (2): $\hat{d}=f(d^{FTM})=d^{FTM}+d^{offset}$, where $d^{DTMM}$ represents raw distance measurement using FTM protocol, and $d^{offset}$ is distance offset (as disclosed in conjunction with FIG. 8), which needs to be calibrated to reduce the offset.

In another example, if RSS is used to estimate determine $\hat{d}$ (estimated distance), then the distance estimation model can be expressed by Equation (3).

$$\hat{d} = f(RSS) = d_0 e^{\frac{RSS(d_0)-RSS}{n}}, \quad \text{Equation (3)}$$

where $d_0$ is a reference distance (e.g., 1 m), $RSS(d_0)$ is RSS measured at the reference distance, and n is a pathloss exponent. The parameters of Equation (3) need to be improved or optimized to produce better or more accurate distance estimates ($\hat{d}$). A standard deviation ($\hat{s}$) (or equivalently reliability) of distance estimates $\hat{d}$ can be represented as Equation (4).

Equation (4): $\hat{s}=g(p)$, where p represents a vector of information for estimating distance $\hat{d}$. The different distance estimation models may be used to estimate distance from nearby anchor nodes (e.g., APs 902) whose locations AP location 908) are known. In some embodiments, there are N anchor nodes (e.g., APs 902) that are used for estimating a position.

Equation (5): $\hat{d}_n=f(p_n)$, where $\hat{d}_n$ indicates a distance estimate from the n-th anchor node (e.g., AP 902.N) where $p_n$ is an input vector related to the anchor node.

Equation (6): $\hat{s}_n=g(p_n)$, where $\hat{s}_n$ the standard deviation of $\hat{d}_n$. With these estimates, the offset update method 952 can estimate the coordinates of STA 910 based on trilateration techniques.

Equation (7): $\hat{z}=[\hat{x}, \hat{y}]^T$, where $\hat{z}$ is a vector of estimated distances and their standard deviations. $\hat{z}$ is determined by Equation (8), in accordance with some embodiments.

Equation (8): $\hat{z}=[\hat{x}, \hat{y}]^T=h(\hat{d}_1, \hat{d}_2, \ldots, \hat{d}_N, \hat{s}_1, \hat{s}_2, \ldots \hat{s}_N)$. With estimated coordinates ($\hat{x}, \hat{y}$) 908, offset update method 952 can determine whether the distance estimation model is accurate or not, e.g., how much of an offset there is.

Figure 10:
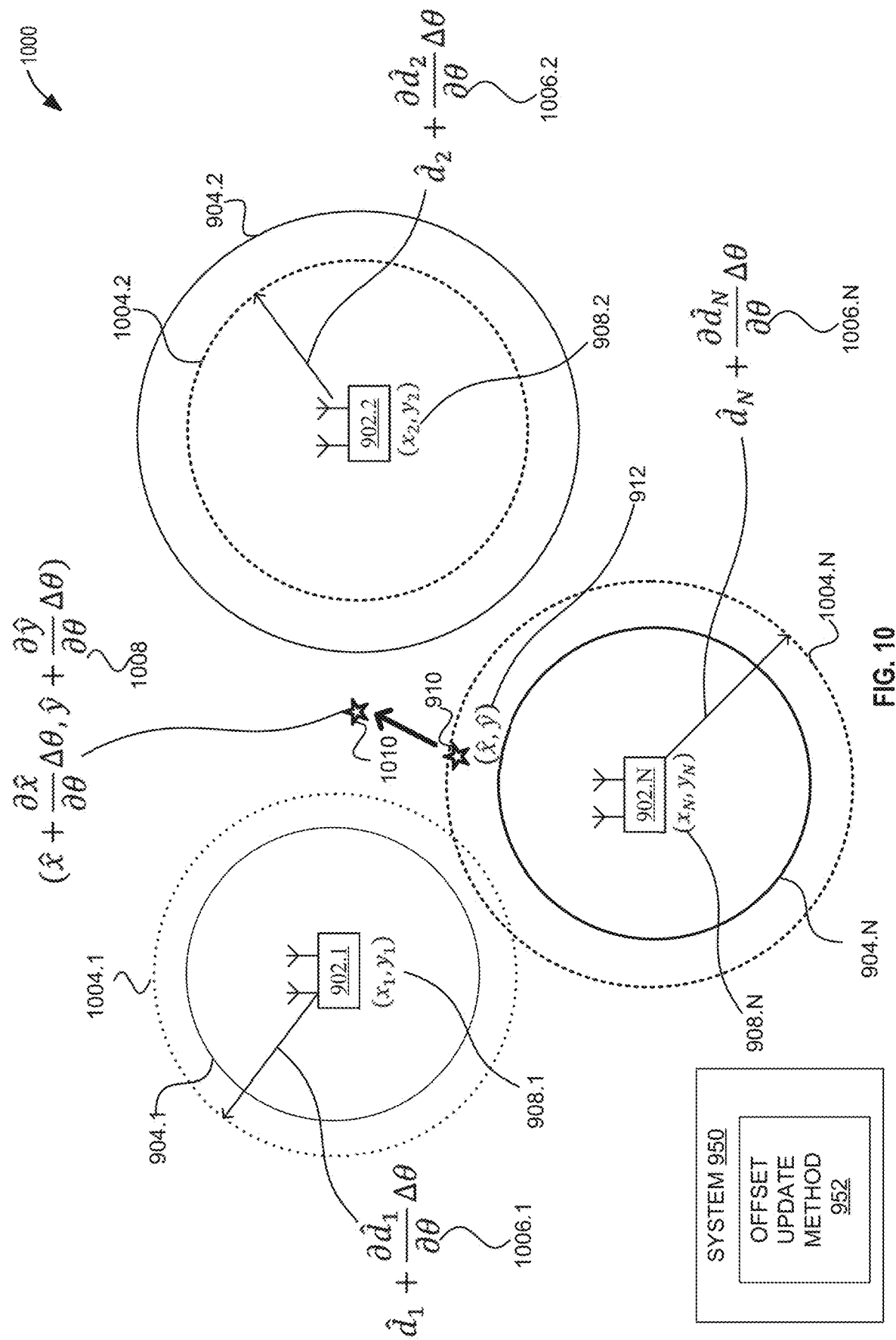
FIG. 10 illustrates distance measurement, in accordance with some embodiments.

FIG. 10 illustrates distance measurement 1000, in accordance with some embodiments. Illustrated in FIG. 10 is APs 902, AP locations 908, STA 910, STA after move (AM) 1010, distance estimate circles 904, distance estimate circles AM 1004, distance estimates AM 1006, STA location 912, and STA location AM 1008.

Equation (9): $j=C(z_1, \ldots, z_N, \hat{d}_1, \ldots, \hat{d}_N, \hat{s}_1, \ldots, \hat{s}_N)$, where J is a cost function for online parameter update, and where $z_n=[x_n, y_n]^T$ represents the coordinates of the n-th anchor node (AP 902.Nth). In some embodiments, J is determined in accordance with Equation (10).

$$J = \sum_{n=1}^{N} \left(\sqrt{(x_n - \hat{x})^2 + (y_n - \hat{y})^2} - \hat{d}_n\right)^2. \quad \text{Equation (10)}$$

In some embodiments, J is determined in accordance with Equation (11).

$$J = \sum_{n=1}^{N} \left(\frac{\sqrt{(x_n - \hat{x})^2 + (y_n - \hat{y})^2} - \hat{d}_n}{\hat{s}_n}\right)^2. \quad \text{Equation (11)}$$

In some embodiments, J is determined based on AP locations 908, distance estimates AM 1006, distance estimates 906, and standard deviation of distance estimates using Equation (4).

Offset update method 952, APs 902, and/or STA 910 are configured to perform a method that at time steps updates parameters in the distance estimation model, e.g., Equation (1), and standard deviation estimation model, e.g., Equation (4).

$$\theta \leftarrow \theta - \lambda \frac{\partial J}{\partial \theta}, \quad \text{Equation (12)}$$

where $\theta$ denotes a parameter in either distance estimation model, e.g., Equation (1), or standard deviation estimation model, e.g., Equation (4), and where $\lambda$ represents the learning rate which determines the step size of each parameter update. In some embodiments, is $\theta \leftarrow \theta + \lambda \frac{\partial J}{\partial \theta}$, Equation (12)

The parameters, $\theta$, are updated in direction of minimizing cost function, e.g., Equation (10) or Equation (11). Using the chain-rule, the partial derivative of the cost function, e.g., Equation (10) or Equation (11), with respect to $\theta$ is expressed by Equation (13).

$$\frac{\partial J}{\partial \theta} = \sum_{n=1}^{N} \frac{\partial C}{\partial \hat{d}_n} \frac{\partial \hat{d}_n}{\partial \theta} + \frac{\partial C}{\partial \hat{s}_n} \frac{\partial \hat{s}_n}{\partial \theta}. \quad \text{Equation (13)}$$

As illustrated in FIG. 10, if $\theta$ changes slightly, every distance estimate, e.g., from Equation (1), or standard deviation estimate results, e.g., from Equation (4), will be changed accordingly. As a result, the estimated coordinates of the device, e.g., STA location AM 1008, and the cost function in Equation (12) will be changed as well.

System 950 may be a separate system in communication with the APs 902 and/or STA 910, 1010. System 950 may include a module offset update method 952. In some embodiments, offset update method 952 is implemented in hardware and/or software, e.g., instruction 624 of FIG. 6. Offset update method 952 may be included in one or more of the APs 902 and/or STA 910.

Figure 11:
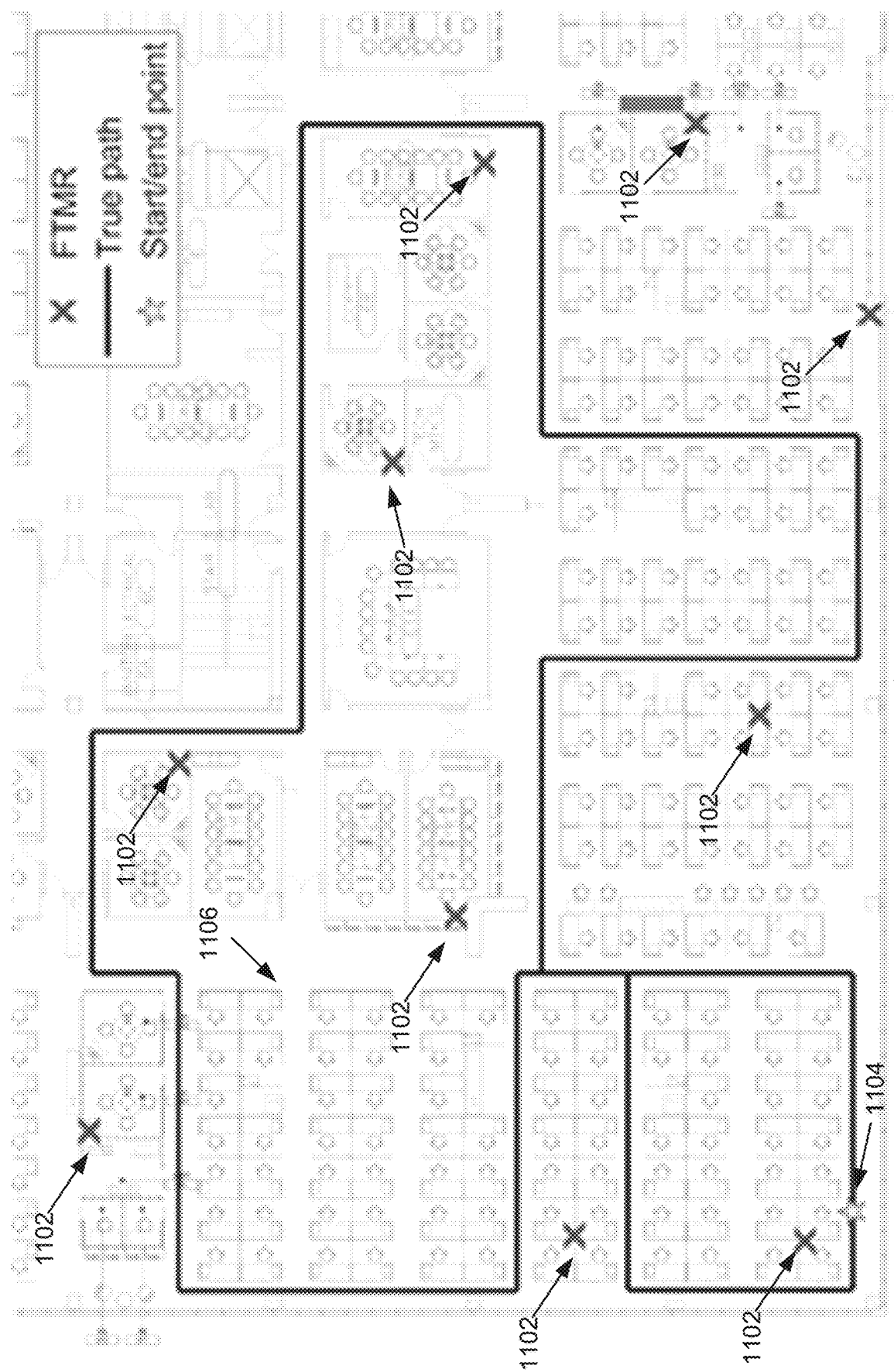
FIG. 11 illustrates an experimental site, in accordance with some embodiments.
Figure 12:
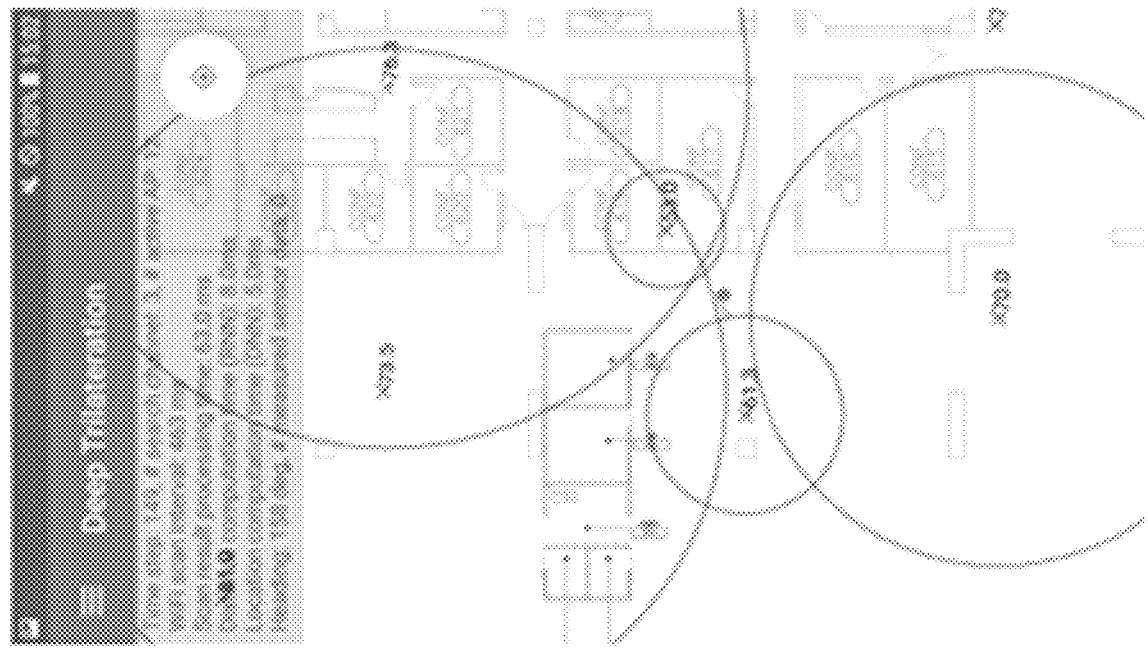
FIG. 12 illustrates a user interface for a real-time application to measure distance, in accordance with some embodiments.
Figure 12:

FIG. 11 illustrates an experimental site 1100, in accordance with some embodiments. APs 1102 are configured to operate in accordance with IEEE 802.11mc. The APs 1102 are operated as FTM responders (FTMRs). The term FTMR indicates an IEEE 802.11mc capable AP 1102 or anchor node, where an anchor node may be an AP 1102 with a known position. Each FTMR, e.g., APs 1102, uses Wi-Fi channel 40 or 48 (i.e., 5 GHz frequency band) for FTM with 40 MHz, bandwidth. FIG. 11 illustrates the floor plan of the experiment site, a 6th floor of a building in Santa Clara, USA. 10 FTMRs, e.g. APs 1102, are installed in 56 m×37 m area. A real-time Android® application is used to measure distance using FTM protocol and show the positioning results on the screen as disclosed in FIG. 12. The start/end point 1104 indicates the start and then the end point. Many workstations 1106 are on the floor. FIG. 12 illustrates a user interface for a real-time application to measure distance, in accordance with some embodiments.

Table 1 below discloses the list of Android® devices used in the experiment. Google® Pixel® series are used that support FTM functionality on Android® version 9.

TABLE 1

List of Android ® Devices for Experiment

| Device # | Model name | Release date | Android version | Optimal offset |
|---|---|---|---|---|
| 1 | Google ® Pixel ® | 2016 October | 9.0 | −9.19 m |
| 2 | Google ® Pixel ® 2 | 2017 October | 9.0 | −8.02 m |
| 3 | Google ® Pixel ® 3 | 2018 October | 9.0 | −6.72 m |

Figure 13:
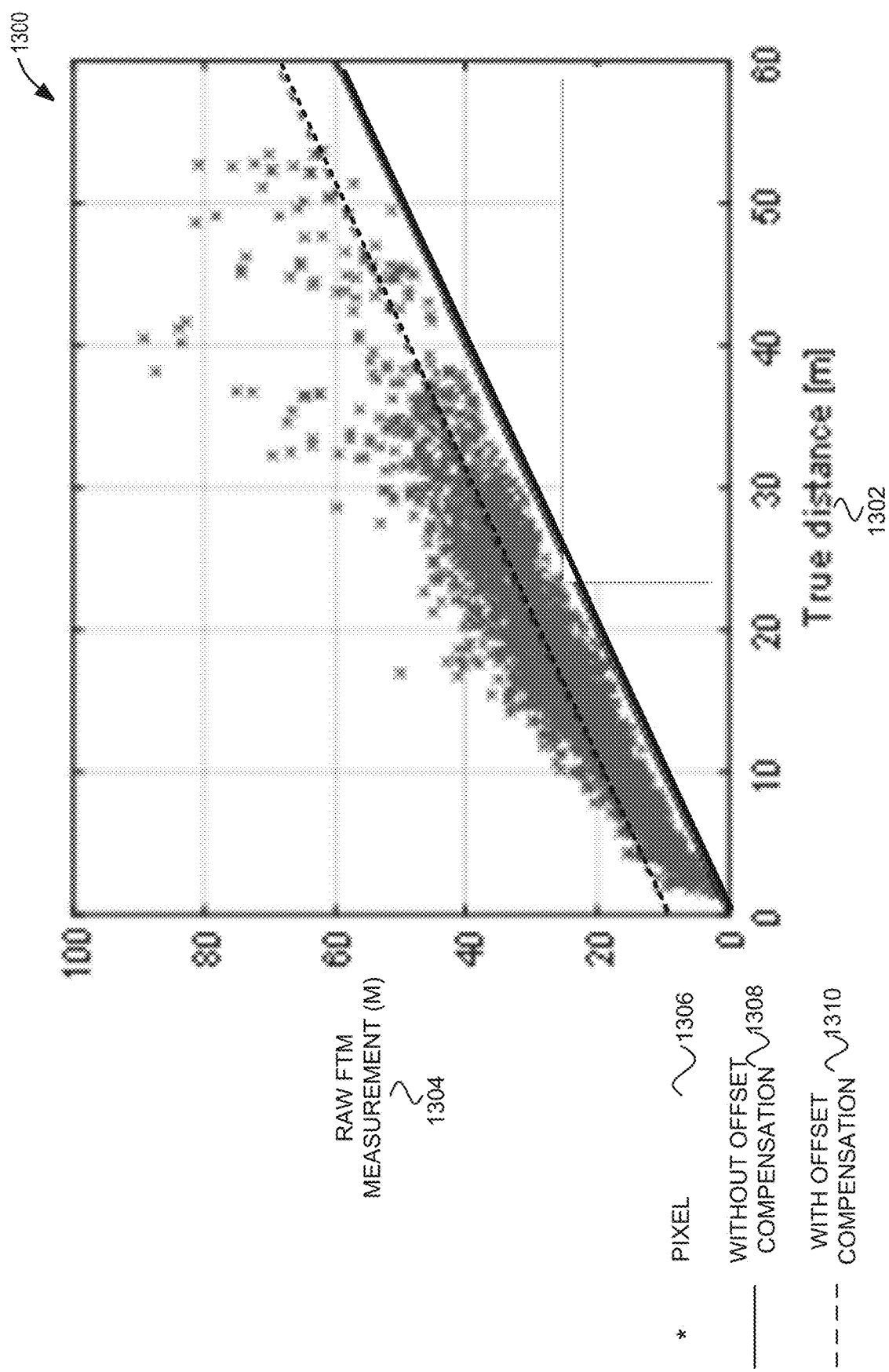
FIGS. 13-15 illustrate tables that illustrates distance estimates using FTM protocol compared with true distance.
Figure 14:
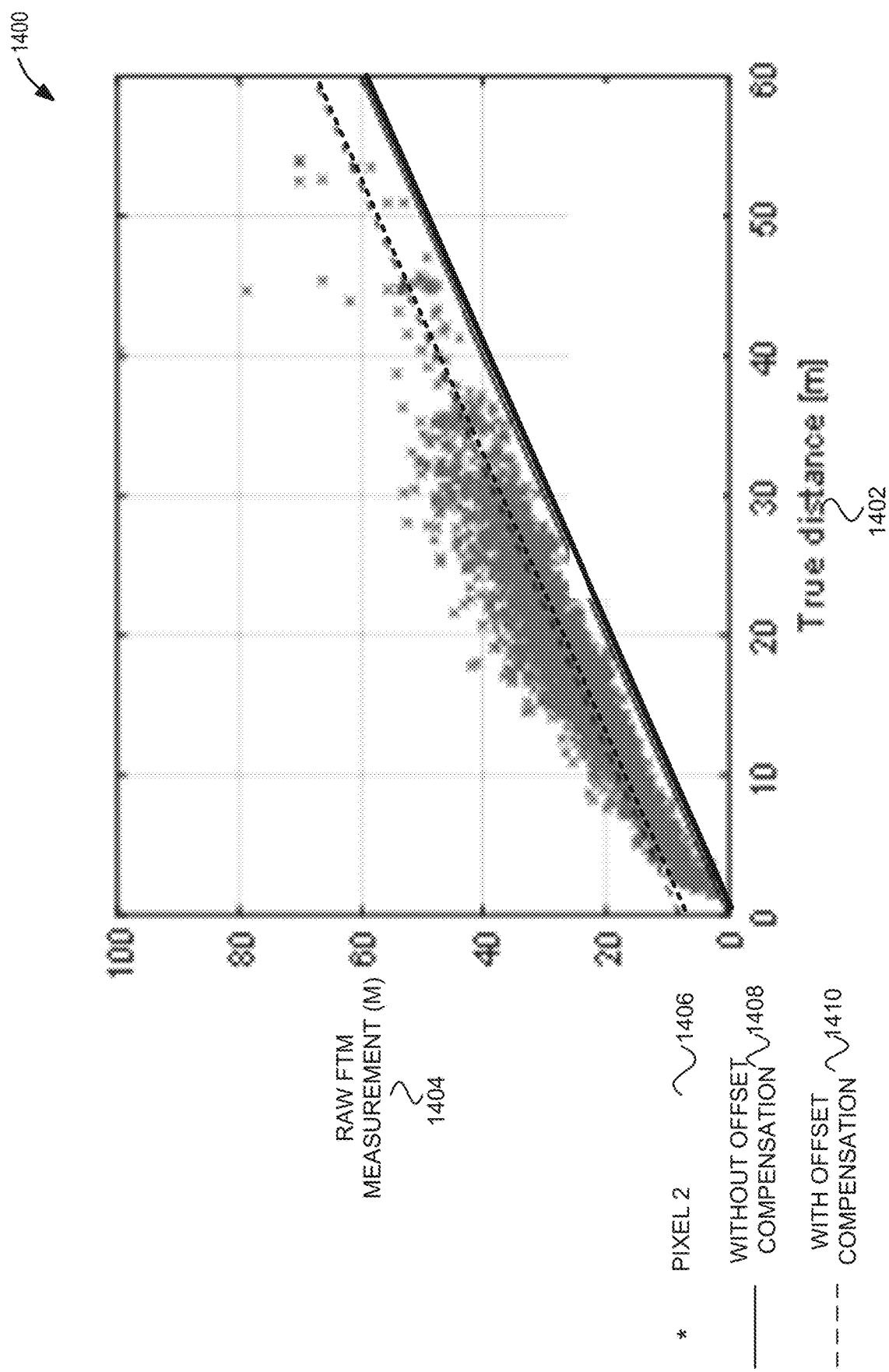
Figure 15:
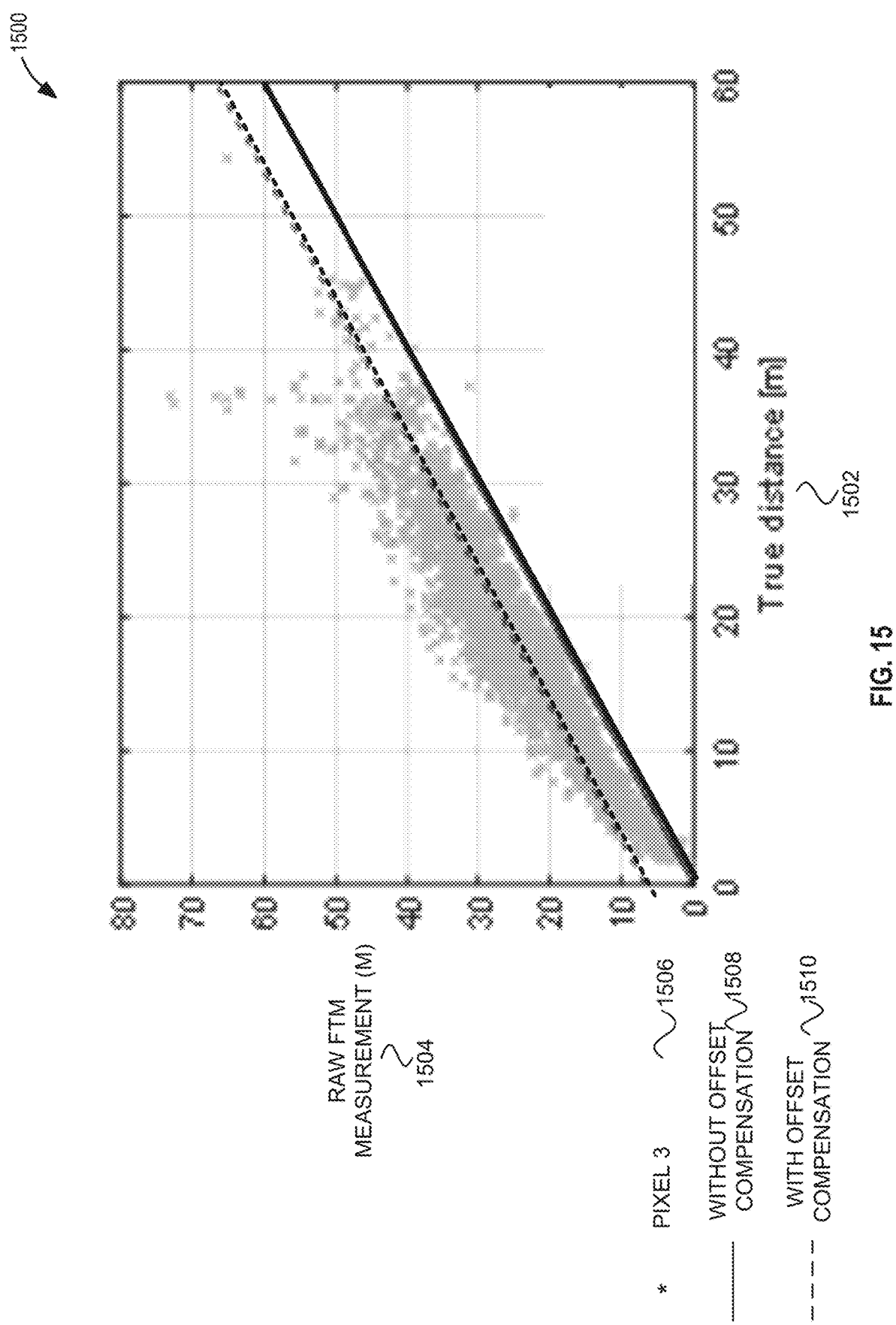

FIGS. 13-15 illustrate tables 1300, 1400, 1500 that illustrates distance estimates using FTM protocol compared with true distance. Illustrated in FIG. 13 is raw FTM measurement (M) 1304, true distance (M) 1302, Pixel 1306 (device #1 of Table 1), without offset compensation 1308, and with offset compensation 1310. Illustrated in FIG. 14 is raw FTM measurement (M) 1404, true distance (M) 1402, Pixel 2 1406 (device #2 of Table 1), without offset compensation 1408, and with offset compensation 1410. Illustrated in FIG. 15 is raw FTM measurement (M) 1504, true distance (M) 1502, Pixel 3 1406 (device #3 of Table 1), without offset compensation 1508, and with offset compensation 1510.

FIGS. 13-15 illustrates that each device has a positive bias from true distance. Equation (2) was used in the experiment for the distance estimation model. For the purpose of performance comparison, an optimal offset for each device, which reduces or minimizes mean squared error was selected. The selected offsets are also illustrated in Table 1.

Figure 16:
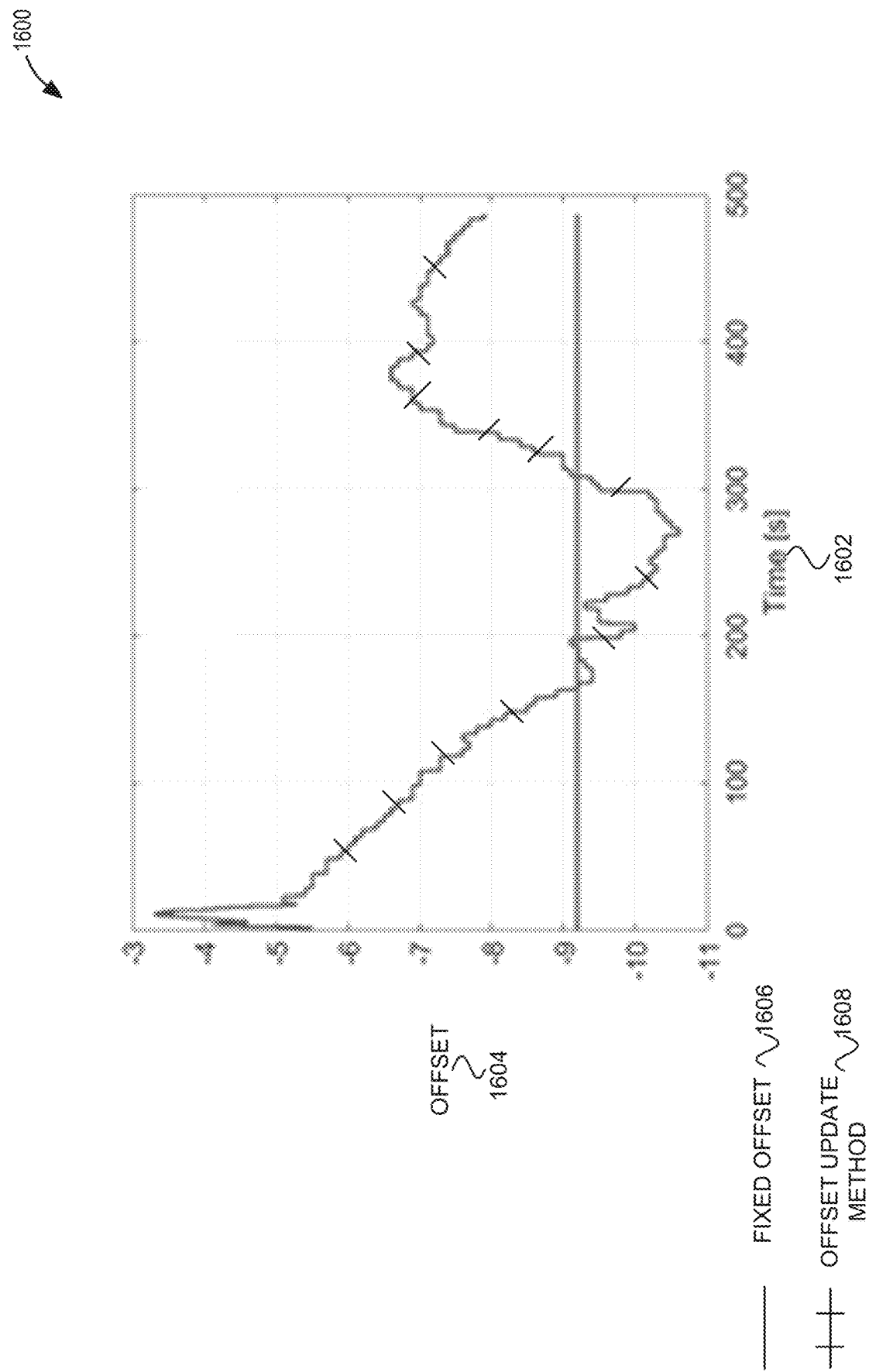
FIGS. 16-18 illustrate the performance of the parameter update method, in accordance with some embodiments.
Figure 17:
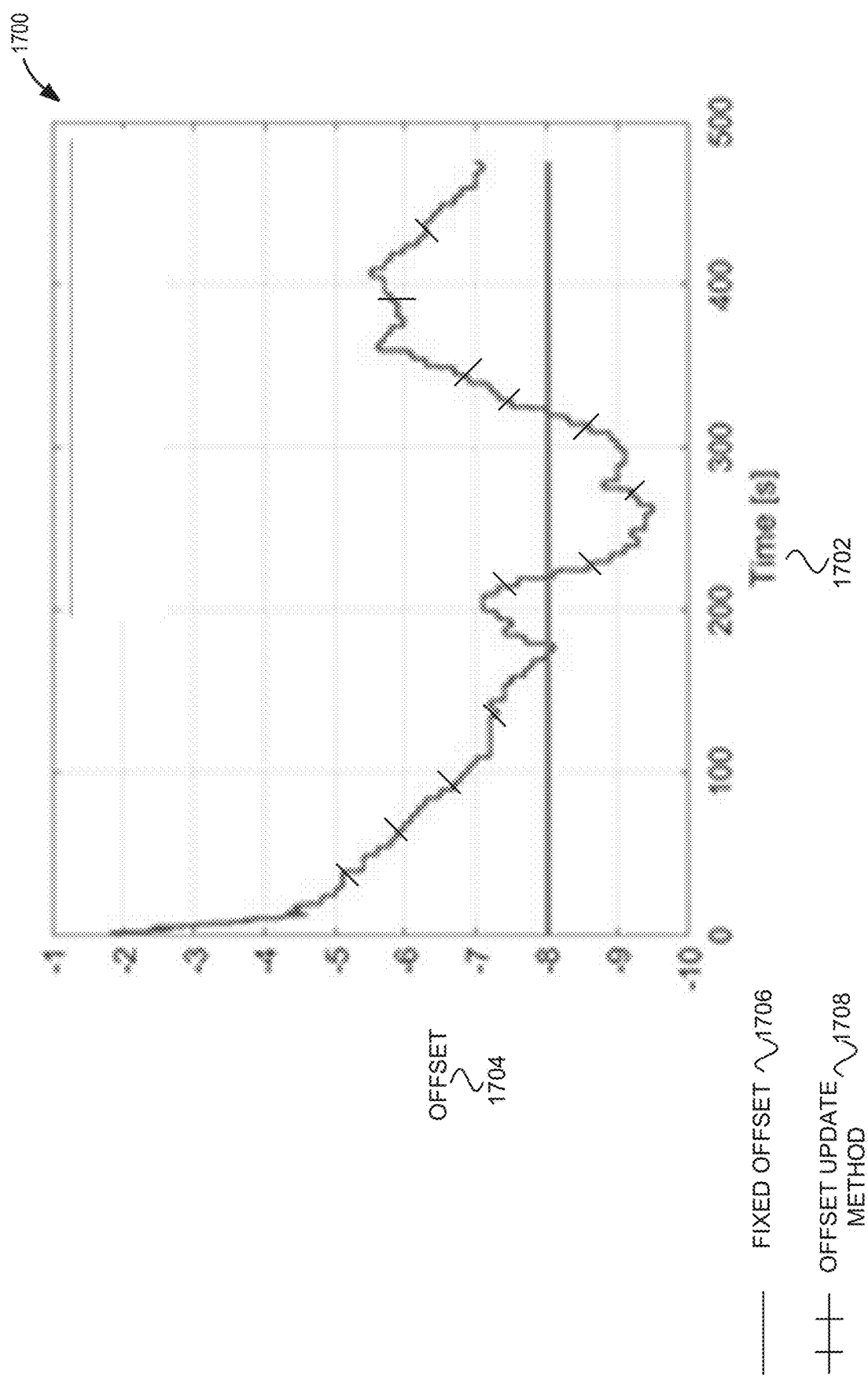
Figure 18:
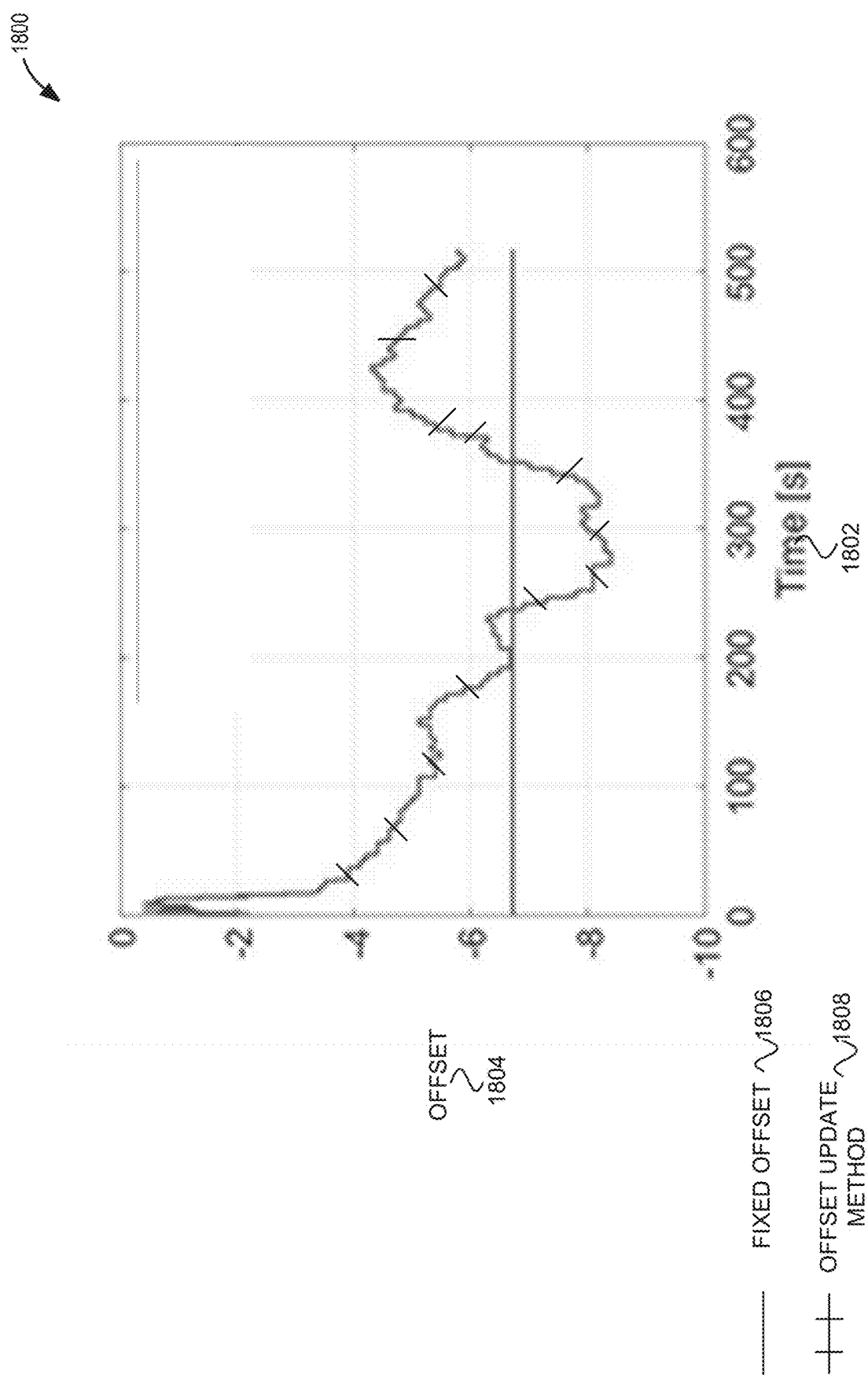

FIGS. 16-18 illustrate the performance of the parameter update method, in accordance with some embodiments. Illustrated in FIG. 16 is table 1600, time 1602, offset 1604, fixed offset 1606, and offset update method 1608 for Pixel (device #1 of Table 1). Illustrated in FIG. 17 is table 1700, time 1702, offset 1704, fixed offset 1706, and offset update method 1708 for Pixel 2 (device #2 of Table 1). Illustrated in FIG. 18 is table 1800, time 1802, offset 1804, fixed offset 1806, and offset update method 1808 for Pixel 3 (device #3 of Table 1). FIGS. 16-18 illustrate the performance of the offset update method 1608, 1708, 1808. In this experiment, the offset update method adaptively updates the distance offset of each device, e.g., the APs 1102.

Figure 19:
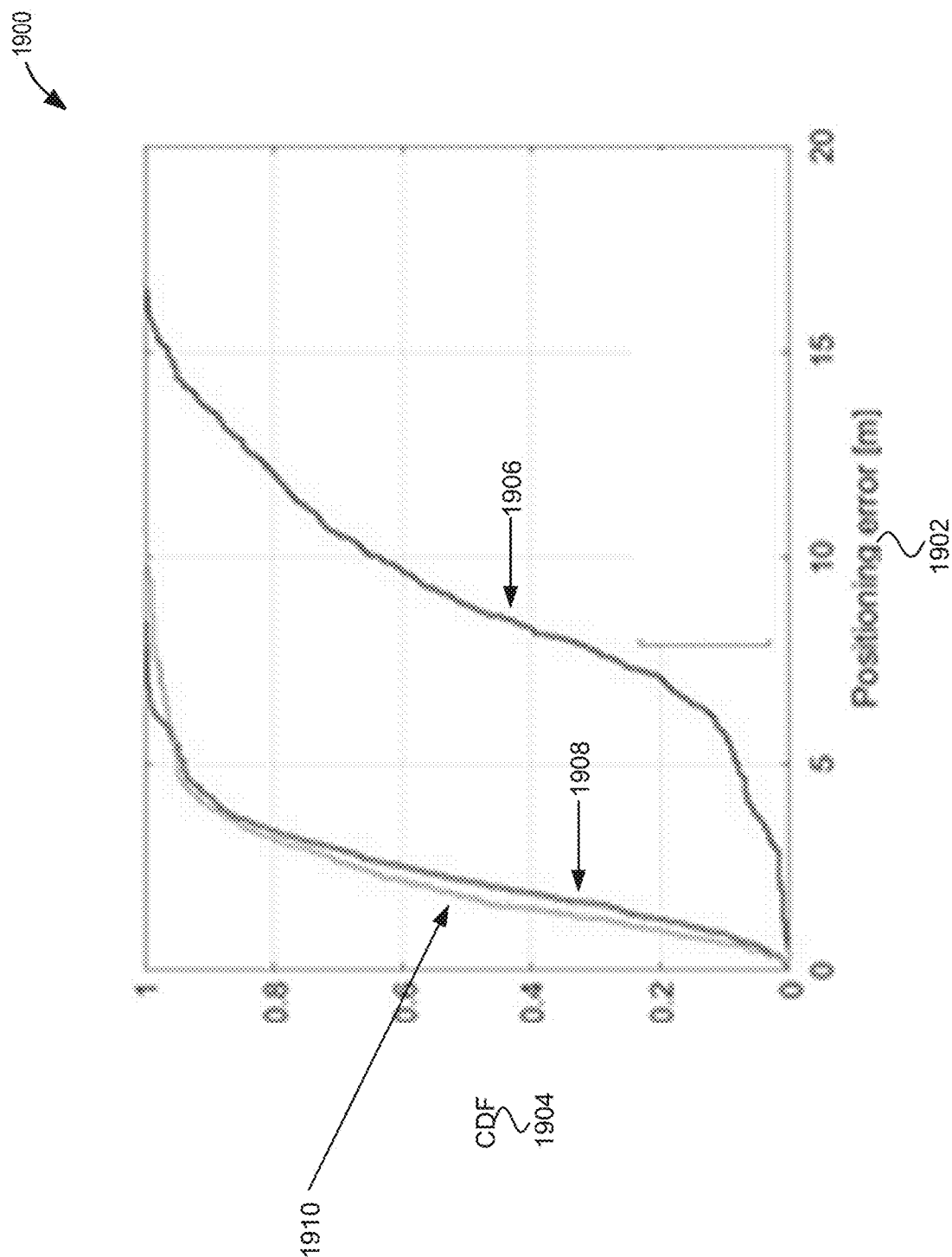
FIGS. 19-21 illustrate cumulative density function (CDF) of positioning error.
Figure 20:
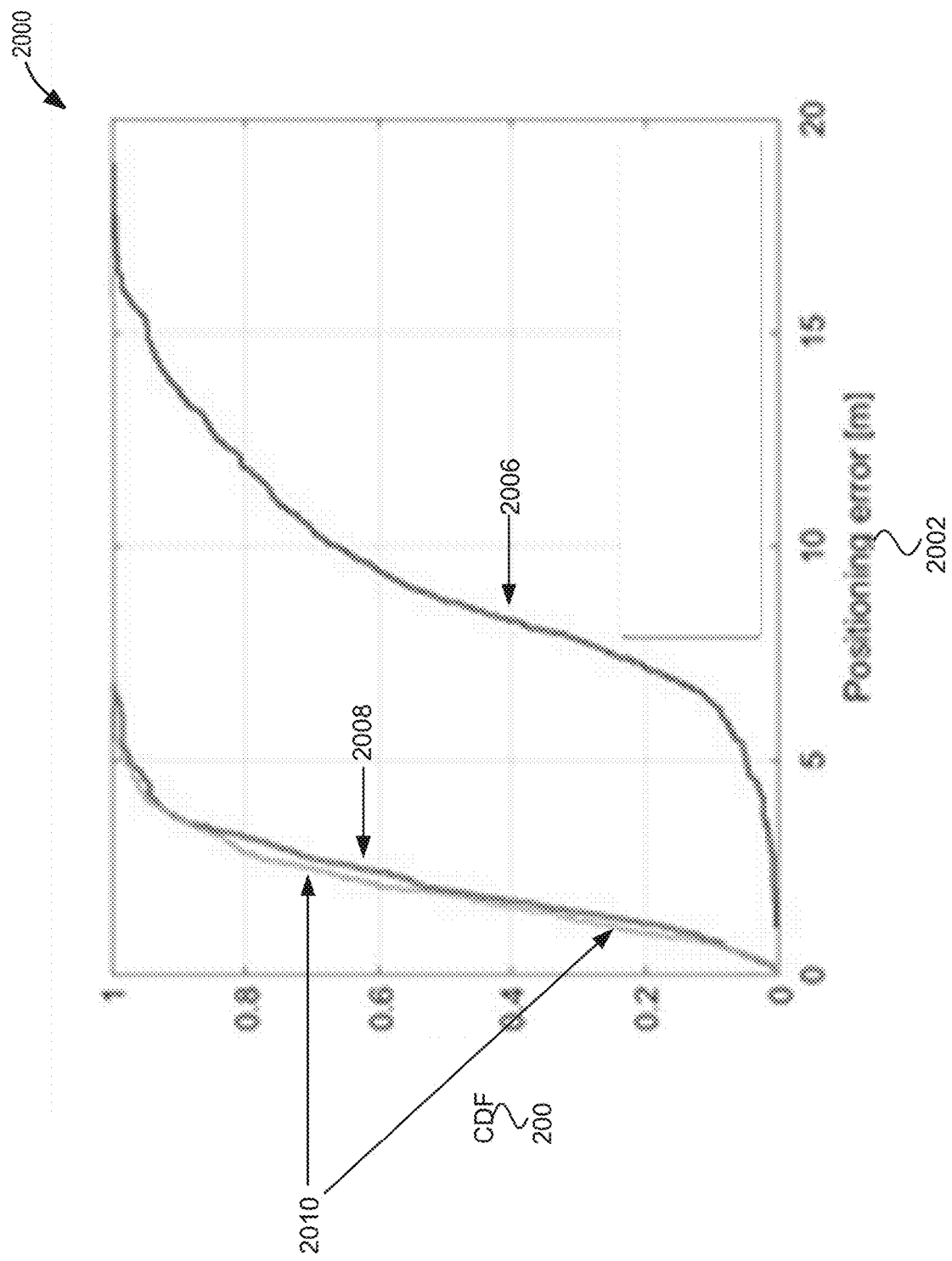
Figure 21:
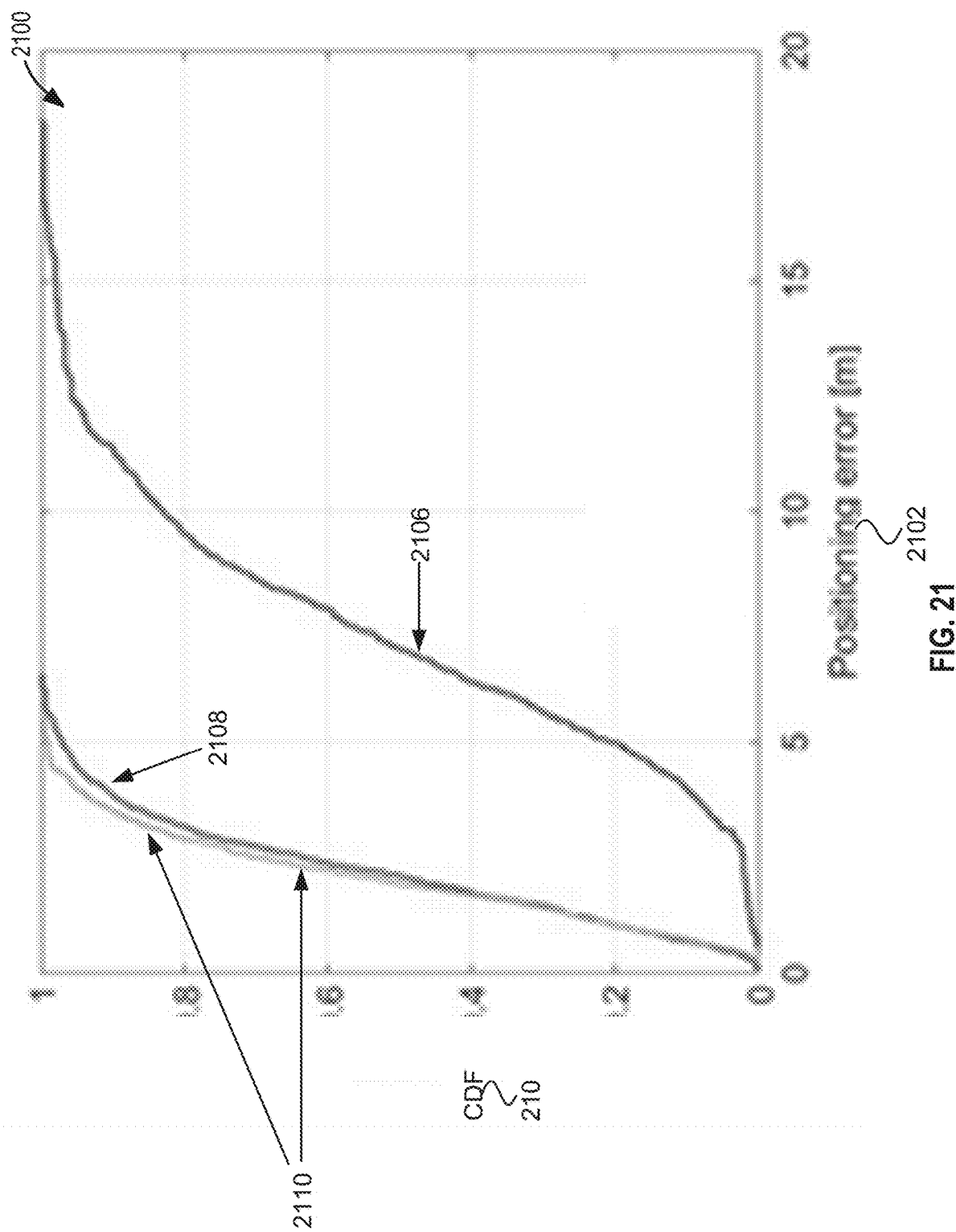

FIGS. 19-21 illustrate cumulative density function (CDF) of positioning error. Illustrated in FIG. 19 is table 1900, positioning error 1902, CDF 1904, raw FTM measurements 1906, calibration with fixed offset 1908, and offset update method 1910 for Pixel (device #1 of Table 1). Illustrated in FIG. 20 is table 2000, positioning error 2002, CDF 2004, raw FTM measurements 2006, calibration with fixed offset 2008, and offset update method 2010 for Pixel 2 (device #2 of Table 1). Illustrated in FIG. 21 is table 2100, positioning error 2102, CDF 2104, raw FTM measurements 2106, calibration with fixed offset 2108, and offset update method 2110 for Pixel 3 (device #3 of Table 1). Illustrated in FIGS. 19-21 is that for every device, raw FTM measurements 1906, 2006, 2106 provides very inaccurate positioning results. On the other hand, the proposed offset update method 1910, 2010, 2110, achieves similar performance with the performance of calibration with fixed offset 1908, 2008, and 2108.

TABLE 2

PERFORMANCE SUMMARY

| Device | Calibration method | MAE [m] | RMSE [m] | 90%-tile error [m] |
|---|---|---|---|---|
| Pixel 1 | Raw FTM | 9.2233 | 9.7202 | 13.5647 |
| | Fixed offset | 2.4100 | 2.7855 | 4.2015 |
| | Offset update method | 2.2003 | 2.7410 | 3.9464 |
| Pixel 2 | Raw FTM | 9.3645 | 9.8150 | 13.6344 |
| | Fixed offset | 2.2381 | 2.6210 | 3.6598 |
| | Offset update method | 2.0509 | 2.4306 | 3.6349 |
| Pixel 3 | Raw FTM | 7.3641 | 7.9233 | 11.2565 |
| | Fixed offset | 2.2032 | 2.5219 | 3.8078 |
| | Offset update method | 2.0553 | 2.3099 | 3.4705 |

Table 2 summarizes the performance of the different methods. The performance metrics are mean absolute error (MAE) and root mean squared error (RMSE), which are respectively defined as indicated in Equation (14) and Equation (15).

$$MAE = E[\hat{z} - \tilde{z}], \text{ and} \quad \text{Equation (14)}$$

$$RMSE = \sqrt{E[|\hat{z} - \tilde{z}|^2]}, \quad \text{Equation (15)}$$

where $E[\cdot]$ is the expectation operator and $\tilde{z}$ is the true coordinates of the device. As illustrated in Table 1, the offset update method outperforms the results obtained using raw FTM and fixed offset. Offset update method may be termed online method, online parameter update method, parameter update method, online update method, online offset method, online offset update method, or another name, in accordance with some embodiments.

The offset update method adaptively changes the distance estimation strategy depending on the situations, in accordance with some embodiments. For instance, in some embodiments, the distance estimation methods improve or optimize the parameters in the distance model via a calibration process. After calibration is done, the parameters are fixed. However, the offset update method adaptively changes parameters depending on the situation. For example, in case of FTM, an increase in the length of cable will increase RTT delay so that the offset update method will adaptively adjust the parameters in response to the increased length of cable.

Figure 22:
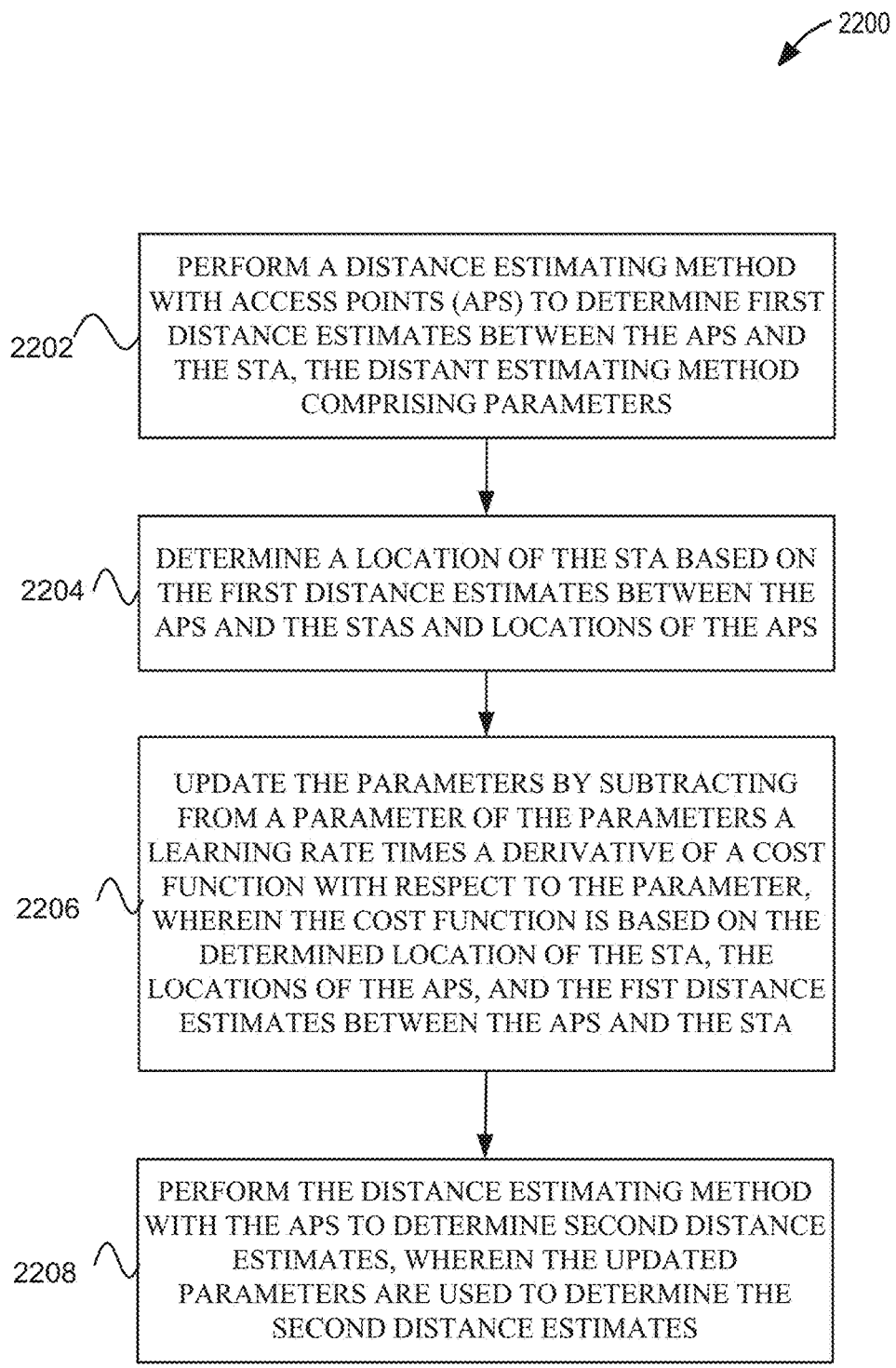
FIG. 22 illustrates a method of parameter update for range-based positioning, in accordance with some embodiments.

FIG. 22 illustrates a method 2200 of parameter update for range-based positioning, in accordance with some embodiments. The method 2200 begins at operation 2202 with performing a distance estimating method with APs to determine first distance estimates between the APs and the STA, the distant estimating method comprising parameters. For example, STA 910 may perform distant estimating methods with APs 902 as disclosed herein. The distance estimating method may be termed range-based positing, in accordance with some embodiments.

The method 2200 continues at operation 2204 with determining a location of the STA based on the first distance estimates between the APs and the STAs and locations of the APs. For example, STA 910 determined $\hat{d}_N$ (distant estimates between the STA 910 and AP n) as disclosed in conjunction with FIGS. 9 and 10, and herein.

The method 2200 continues at operation 2206 with updating the parameters by subtracting from a parameter of the parameters a learning rate times a derivative of a cost function with respect to the parameter, where the cost function is based on the determined location of the STA, the locations of the APs, and the first distance estimates between the APs and the STA. For example, STA 910, APs 902, system 950, offset update method 952, determined updates to parameters based on Equation (12), in accordance with some embodiments.

The method 2200 continues at operation 2208 with performing the distance estimating method with the APs to determine second distance estimates, where the updated parameters are used to determine the second distance estimates. For example, as illustrated in FIG. 10 STA 910 (or STA AM 1010) and APs 902 determined second distance estimates, 1006, in accordance with some embodiments.

Method 2200 may be performed by a STA 910, 1010, 504, an apparatus of STA 910, 1010, 504, an AP 902, 502, an apparatus of an AP 902, 502, a system 950, an apparatus of a system 950, and/or an offset update method 952. One or more of the operations of method 2200 may be optional. Method 2200 may include one or more additional operations. The operations of method 2200 may be performed in a different order, in accordance with some embodiments.

Figure 23:
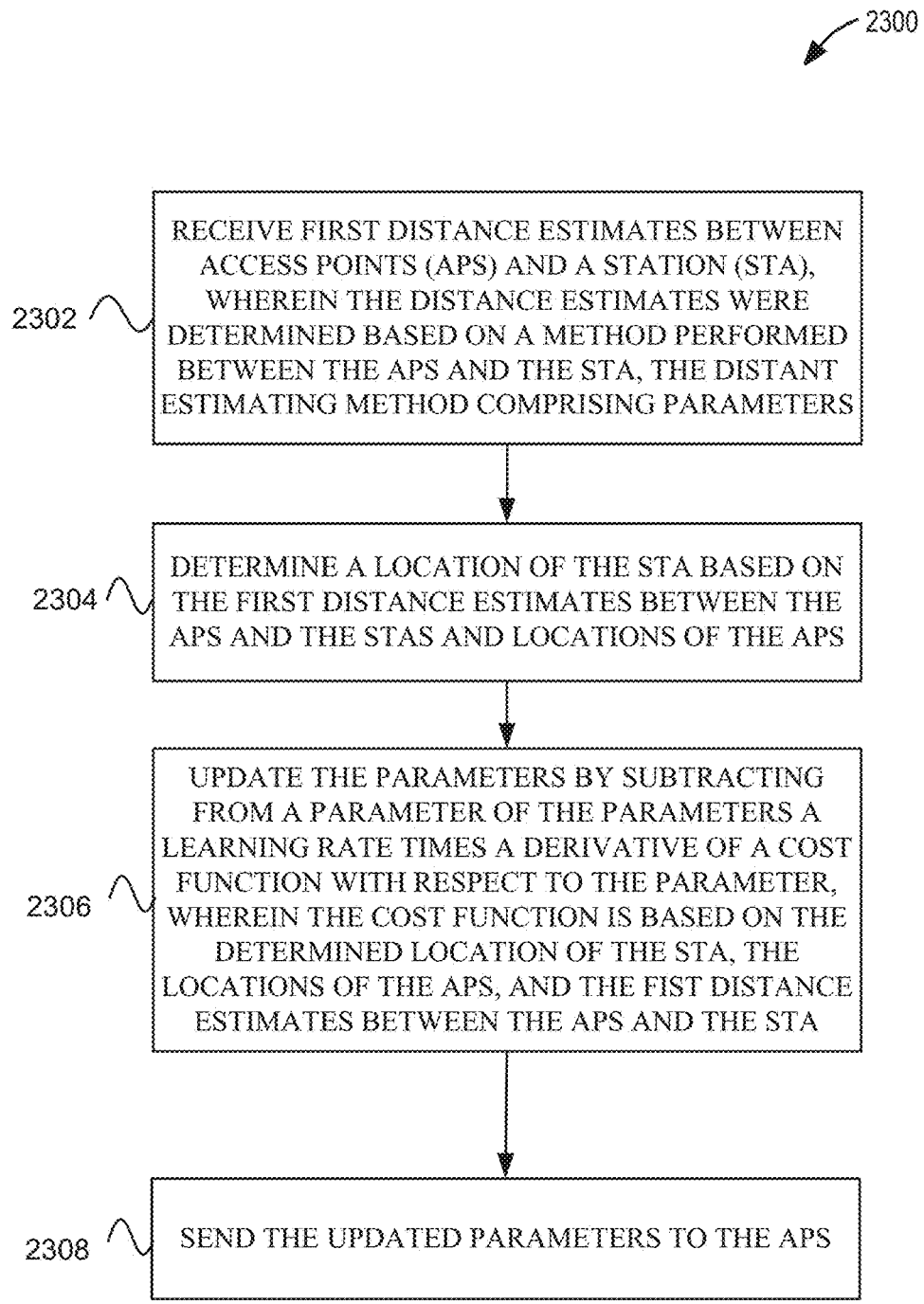
FIG. 23 illustrates a method of parameter update for range-based positioning, in accordance with some embodiments.

FIG. 23 illustrates a method 2300 of parameter update for range-based positioning, in accordance with some embodiments. The method 2300 begins with operation 2302 with receiving first distance estimates between APs and a STA, where the distance estimates were determined based on a method performed between the APs and the STA, the distant estimating method comprising parameters. For example, system 950 and/or offset update method 950 may receive first distance estimates between APs and a STA as disclosed in conjunction with FIGS. 9 and 10.

Method 2300 continues at operation 2304 with determining a location of the STA based on the first distance estimates between the APs and the STAs and locations of the APs. For example, system 950 and/or offset update method 950 may determine a location of the STA 910 as disclosed in conjunction with FIGS. 9 and 10.

Method 2300 continues at operation 2306 with updating the parameters by subtracting from a parameter of the parameters a learning rate times a derivative of a cost function with respect to the parameter, where the cost function is based on the determined location of the STA, the locations of the APs, and the first distance estimates between the APs and the STA. For example, system 950 and/or offset update method 950 may determine updates to parameters based on Equation (12) as disclosed in conjunction with FIGS. 9 and 10.

Method 2300 continues with sending the updated parameters to the APs. For example, system 950 and/or offset update method 950 may send the updated parameters to the APs 902.

Method 2300 may be performed by a STA 910, 1010, 504, an apparatus of STA 910, 1010, 504, an AP 902, 502, an apparatus of an AP 902, 502, a system 950, an apparatus of a system 950, and/or an offset update method 952. One or more of the operations of method 2300 may be optional. Method 2300 may include one or more additional operations. The operations of method 2300 may be performed in a different order, in accordance with some embodiments.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station (STA), the apparatus comprising memory; and processing circuitry coupled to the memory, the processing circuitry configured to:
   perform a distance estimating method with access points (APs) to determine first distance estimates between the APs and the STA, the distant estimating method comprising parameters;
   determine a location of the STA based on the first distance estimates between the APs and the STAs and locations of the APs;
   update the parameters by subtracting from a parameter of the parameters a learning rate times a derivative of a cost function with respect to the parameter, wherein the cost function is based on the determined location of the STA, the locations of the APs, and the first distance estimates between the APs and the STA;
   move a physical location of the STA;
   perform the distance estimating method with the APs to determine second distance estimates, wherein the updated parameters are used to determine the second distance estimates;
   determine another location of the STA based on the second distance estimates between the APs and the STAs and the locations of the APs; and
   update the updated parameters by subtracting from an updated parameter of the updated parameters the learning rate times the derivative of the cost function with respect to the parameter.

2. The apparatus of claim 1, wherein the cost function is equal to:

$$J = \sum_{n=1}^{N} \left( \sqrt{(x_n - \hat{x})^2 + (y_n - \hat{y})^2} - \hat{d}_n \right)^2,$$

where J is the cost function, N is the number of APs, $(x_n, y_n)$ is the location of the nth AP of the APs, $(\hat{x}, \hat{y})$ is the determined location of the STA, and $\hat{d}_n$ is the estimated distance of the determined first distance estimates between the nth AP of the APs and the STA.

3. The apparatus of claim 1, wherein the cost function is equal to:

$$J = \sum_{n=1}^{N} \left( \frac{\sqrt{(x_n - \hat{x})^2 + (y_n - \hat{y})^2} - \hat{d}_n}{\hat{s}_n} \right)^2,$$

where J is the cost function, N is the number of APs, $(x_n, y_n)$ is the location of the nth AP of the APs, $(\hat{x}, \hat{y})$ is the determined location of the STA, $\hat{d}_n$ is the estimated distance of the determined first distance estimates between the nth AP of the APs and the STA, and $\hat{s}_n$ is a measure of reliability of $\hat{d}_n$.

4. The apparatus of claim 1, wherein the processing circuitry is further configured to:
   receive the locations of APs.

5. The apparatus of claim 1, wherein the derivative of the cost function with respect to the parameter is a partial derivative of the cost function with respect to the parameter.

6. The apparatus of claim 5, wherein the partial derivate of the cost function with respect to the parameter is equal to:

$$\frac{\partial J}{\partial \theta} = \sum_{n=1}^{N} \frac{\partial C}{\partial \hat{d}_n} \frac{\partial d_n}{\partial \theta} + \frac{\partial C}{\partial \hat{s}_n} \frac{\partial s_n}{\partial \theta},$$

where J is the cost function, $\theta$ is the parameter, N is a number of the APs, C is the cost function, $\hat{d}_n$ is the estimated distance of the determined first distance estimates between the nth AP of the APs and the STA, $d_n$ is the actual distance between the nth AP of the APs and the STA, $\hat{s}_n$ is an estimate of a reliability of $\hat{d}_n$, and $s_n$ is an actual reliability of $\hat{d}_n$.

7. The apparatus of claim 1, wherein perform the distance estimating method with the APs to determine second distance estimates further comprises:
   determine a second distance estimate based on:

$$\hat{d}_N + \frac{\partial \hat{d}_N}{\partial \theta} \Delta \theta,$$

wherein $\hat{d}_n$ is me estimated distance of the determined first distance estimates between the nth AP of the APs and the STA, θ is the parameter, and Δθ is the difference between the parameter and the updated parameter.

8. The apparatus of claim 1, wherein the distance estimating method is fine timing measurement (FTM) in accordance with Institute of Electrical and Electronic Engineering (IEEE) 802.11mc, az, high efficiency (HE), or extremely high throughput (EHT), or the distance estimating method is based on received signal strength (RSS).

9. The apparatus of claim 1, wherein the parameters are standard deviation estimates of distance errors of the APs or parameters of a fine timing measurement (FTM) method.

10. The apparatus of claim 1, wherein a number of APs is at least three, and wherein determine the location of the STA based on the first distance estimates between the APs and the STAs and locations of the APs further comprises:
determine the location of the STA based on three of the first distance estimates and a triangulation method.

11. The apparatus of claim 1, wherein the distance estimating method is based on received signal strength (RSS), and wherein the parameters comprise a pathloss exponent and a reference distance.

12. The apparatus of claim 1, wherein the processing circuitry is further configured to:
transmit the updated parameters to the AP.

13. The apparatus of claim 1 further comprising: mixer circuitry to downconvert RF signals to baseband signals; and synthesizer circuitry, the synthesizer circuitry comprising one of a fractional-N synthesizer or a fractional N/N+1 synthesizer, the synthesizer circuitry configured to generate an output frequency for use by the mixer circuitry, wherein the processing circuitry is configured to decode the baseband signals, the baseband signals including PPDUs received to perform the distance estimating method.

14. The apparatus of claim 1 further comprising: mixer circuitry to down-convert RF signals to baseband signals; and synthesizer circuitry, the synthesizer circuitry comprising a delta-sigma synthesizer, the synthesizer circuitry configured to generate an output frequency for use by the mixer circuitry, wherein the processing circuitry is configured to decode the baseband signals, the baseband signals including PPDUs received to perform the distance estimating method.

15. A non-transitory computer-readable storage medium that stores instructions for execution by one or more processors of an apparatus of a station (STA), the instructions to configure the one or more processors to:
perform a distance estimating method with access points (APs) to determine first distance estimates between the APs and the STA, the distant estimating method comprising parameters;
determine a location of the STA based on the first distance estimates between the APs and the STAs and locations of the APs;
update the parameters by subtracting from a parameter of the parameters a learning rate times a derivative of a cost function with respect to the parameter, wherein the cost function is based on the determined location of the STA, the locations of the APs, and the first distance estimates between the APs and the STA;
move a physical location of the STA;
perform the distance estimating method with the APs to determine second distance estimates, wherein the updated parameters are used to determine the second distance estimates;
determine another location of the STA based on the second distance estimates between the APs and the STAs and the locations of the APs; and
update the updated parameters by subtracting from an updated parameter of the updated parameters the learning rate times the derivative of the cost function with respect to the parameter.

16. The non-transitory computer-readable storage medium of claim 15,
wherein the cost function is equal to:

$$J = \sum_{n=1}^{N} \left( \sqrt{(x_n - \hat{x})^2 + (y_n - \hat{y})^2} - \hat{d}_n \right)^2,$$

where J is the cost function, N is the number of APs, $(x_n, y_n)$ is the location of the nth AP of the APs, $(\hat{x}, \hat{y})$ is the determined location of the STA, and $\hat{d}_n$ is the estimated distance of the determined first distance estimates between the nth AP of the APs and the STA.

17. An apparatus of a system, the apparatus comprising memory; and processing circuitry coupled to the memory, the processing circuitry configured to:
receive first distance estimates between access points (APs) and a station (STA), wherein the distance estimates were determined based on a method performed between the APs and the STA, the distant estimating method comprising parameters;
determine a location of the STA based on the first distance estimates between the APs and the STAs and locations of the APs;
update the parameters by subtracting from a parameter of the parameters a learning rate times a derivative of a cost function with respect to the parameter, wherein the cost function is based on the determined location of the STA, the locations of the APs, and the first distance estimates between the APs and the STA;
send the updated parameters to the APs;
receive second distance estimates between APs and the STA, wherein the second distance estimates were determined based on the distant estimating method comprising the updated parameter;
determine another location of the STA based on the second distance estimates between the APs and the STAs and the locations of the APs;
update the updated parameters, to generate twice updated parameters, by subtracting from a parameter of the updated parameters the learning rate times the derivative of the cost function with respect to the parameter; and
send the twice updated parameters to the APs.

18. The apparatus of claim 17, wherein the processing circuitry is further configured to:
send the updated parameters to the STA.

19. The apparatus of claim 17, wherein the processing circuitry comprises one or more application specific integrated circuits (ASICs).

* * * * *